United States Patent
Sabolis et al.

(10) Patent No.: US 10,935,524 B2
(45) Date of Patent: Mar. 2, 2021

(54) GAS CHROMATOGRAPH DEVICE WITH INDUCTIVELY HEATED COLUMN AND METHOD OF USE THEREOF

(71) Applicant: CEM Corporation, Lucidity Division, Matthews, NC (US)

(72) Inventors: Alyssa Whitney Sabolis, Weddington, NC (US); Michael John Collins, Jr., Huntersville, NC (US); Michael Craig Davis, Tega Cay, SC (US); Daniel Charles Scheid, Indian Trail, NC (US); Brian Thomas Unites, Shelby, NC (US); Richard Michael Chapman, Fort Mill, SC (US)

(73) Assignee: CEM CORPORATION, LUCIDITY DIVISION, Matthews, NC (US)

( * ) Notice: Subject to any disclaimer, the term of this patent is extended or adjusted under 35 U.S.C. 154(b) by 164 days.

(21) Appl. No.: 15/979,445

(22) Filed: May 14, 2018

(65) Prior Publication Data

US 2019/0033268 A1    Jan. 31, 2019

Related U.S. Application Data

(60) Provisional application No. 62/537,803, filed on Jul. 27, 2017.

(51) Int. Cl.
*B01D 53/02* (2006.01)
*G01N 30/30* (2006.01)
*G01N 30/02* (2006.01)

(52) U.S. Cl.
CPC ....... *G01N 30/30* (2013.01); *G01N 2030/025* (2013.01); *G01N 2030/3007* (2013.01)

(58) Field of Classification Search
CPC ..... G01N 2030/025; G01N 2030/3007; G01N 30/30
See application file for complete search history.

(56) References Cited

U.S. PATENT DOCUMENTS

| 3,023,835 A | * | 3/1962 | Brashear | G01N 30/30 73/23.26 |
| 3,694,157 A | * | 9/1972 | Koch | G01N 7/14 436/155 |

(Continued)

FOREIGN PATENT DOCUMENTS

| WO | 9404915 A1 | 3/1994 |
| WO | 2010066773 A1 | 6/2010 |

OTHER PUBLICATIONS

International Search Report and Written Opinion dated Oct. 15, 2018 for PCT/US2018/044175.

*Primary Examiner* — Christopher P Jones
(74) *Attorney, Agent, or Firm* — Jeffrey C. Watson; Mathew L. Grell; Grell & Watson Patent Attorneys LLC

(57) ABSTRACT

A gas chromatograph device includes an inductively heated column configured for gas chromatography. The gas chromatograph includes a column configured for gas chromatography and an inductive heating source. The inductive heating source is configured to directly or indirectly heat the column. The inductive heating source includes an inductive heating element or coil. The inductive heating element or coil is configured to induce a current directly or indirectly in the column. Wherein, the column in the gas chromatograph is inductively heated via the inductive heating source.

15 Claims, 19 Drawing Sheets

(56) References Cited

U.S. PATENT DOCUMENTS

| | | | |
|---|---|---|---|
| 3,879,181 A * | 4/1975 | Nakamura | G01N 30/12 96/104 |
| 4,044,593 A | 8/1977 | Haruki et al. | |
| 4,476,017 A | 10/1984 | Scharff et al. | |
| 4,487,693 A | 12/1984 | Ito | |
| 4,854,700 A | 8/1989 | Cutie et al. | |
| 5,215,340 A | 6/1993 | Ledford, Jr. | |
| 5,372,716 A * | 12/1994 | Levy | B01D 11/0203 210/198.2 |
| 5,458,783 A * | 10/1995 | Levy | G01N 30/28 210/198.2 |
| 5,589,630 A * | 12/1996 | Wiegand | G01N 30/30 73/23.35 |
| 5,750,029 A * | 5/1998 | Houck | B01D 11/0203 210/137 |
| 5,830,262 A | 11/1998 | Marchini et al. | |
| 5,939,614 A * | 8/1999 | Walters | G01N 30/30 422/88 |
| 6,139,732 A | 10/2000 | Pelletier | |
| 6,162,362 A | 12/2000 | Ma et al. | |
| 6,354,136 B1 * | 3/2002 | Bremer | G01N 30/30 210/198.2 |
| 6,427,522 B1 * | 8/2002 | Thomas | G01N 30/30 73/23.35 |
| 6,614,228 B2 | 9/2003 | Hofmann et al. | |
| 6,679,989 B2 | 1/2004 | Willis et al. | |
| 7,875,175 B2 | 1/2011 | Wheat et al. | |
| 7,909,994 B2 | 3/2011 | Wheat et al. | |
| 8,066,876 B2 | 11/2011 | Hampton et al. | |
| 8,294,091 B2 | 10/2012 | Jarrell | |
| 2005/0199121 A1 * | 9/2005 | Crnko | G01N 30/30 95/87 |
| 2010/0163490 A1 | 7/2010 | Lasalle | |
| 2010/0224791 A1 | 9/2010 | Tartaglia et al. | |
| 2010/0230402 A1 | 9/2010 | Chang et al. | |
| 2010/0314383 A1 | 12/2010 | Kollewe | |
| 2011/0305608 A1 | 12/2011 | Gerstel | |
| 2013/0306563 A1 | 11/2013 | Blaschyk | |
| 2014/0331744 A1 | 11/2014 | Van Egmond et al. | |
| 2015/0075374 A1 * | 3/2015 | Tolley | G01N 30/30 95/87 |
| 2016/0214032 A1 | 7/2016 | Lofving et al. | |
| 2016/0250566 A1 | 9/2016 | Bailey | |

* cited by examiner

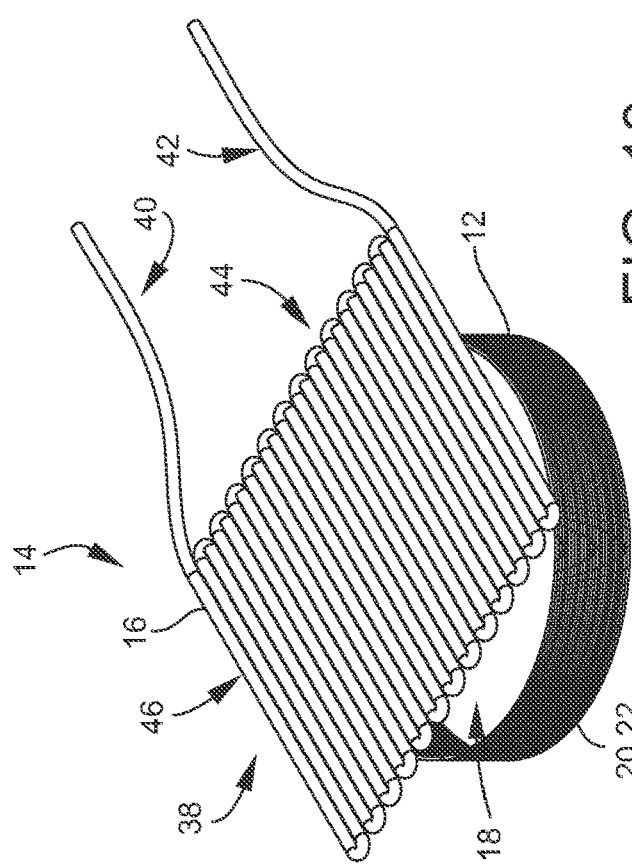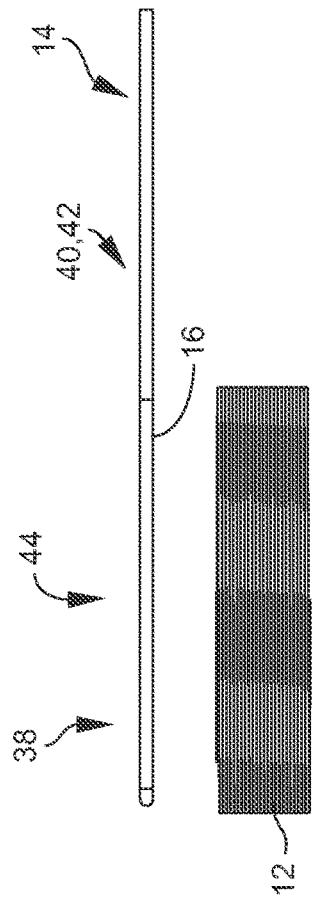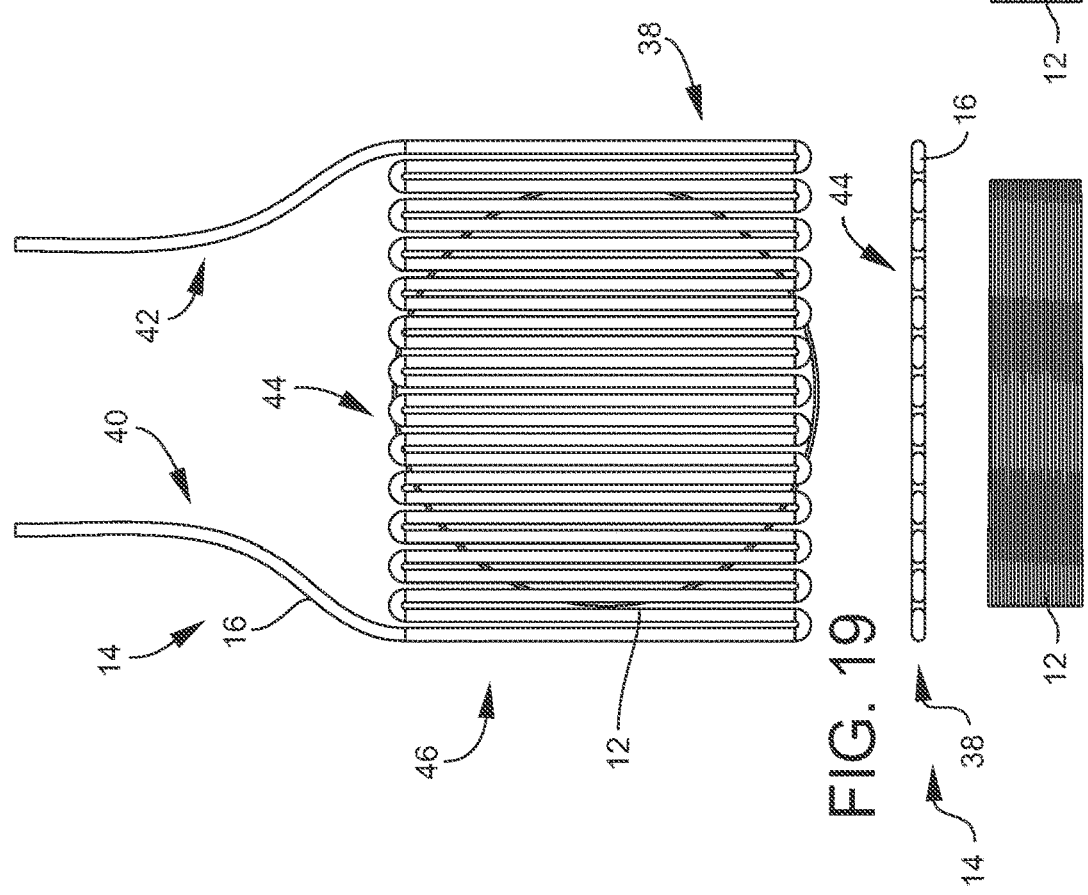

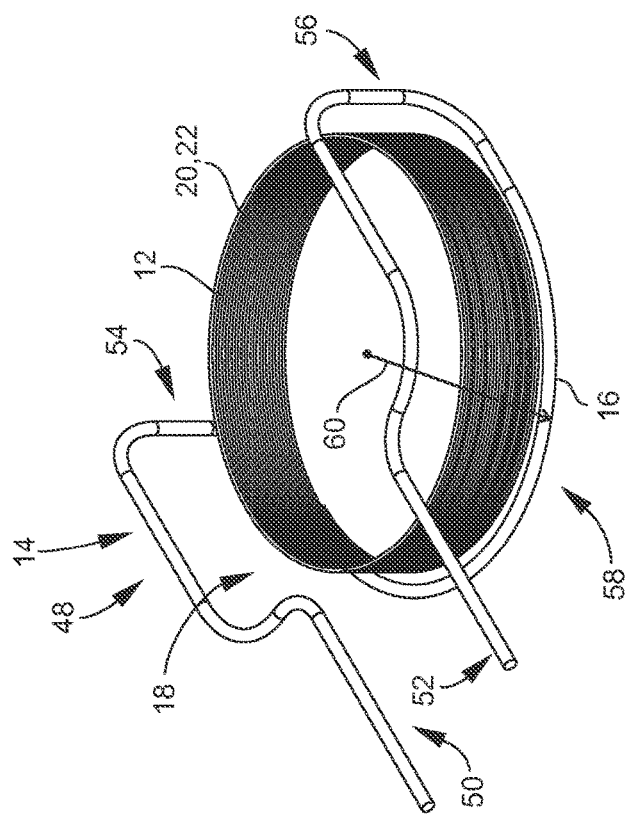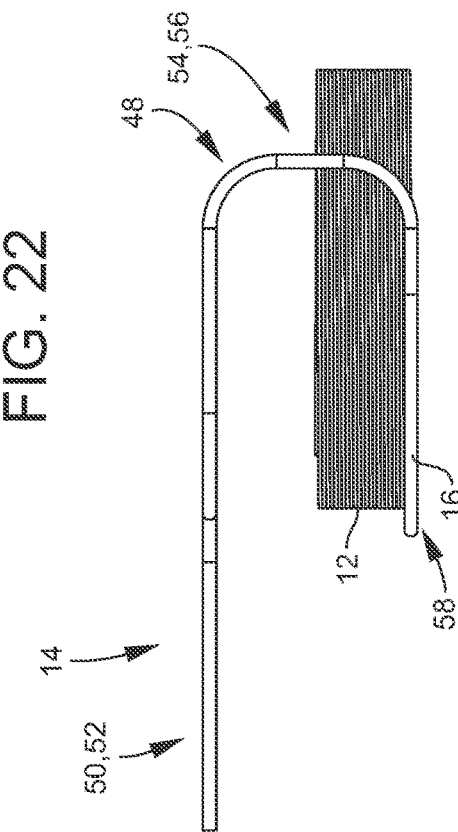
FIG. 22
FIG. 25
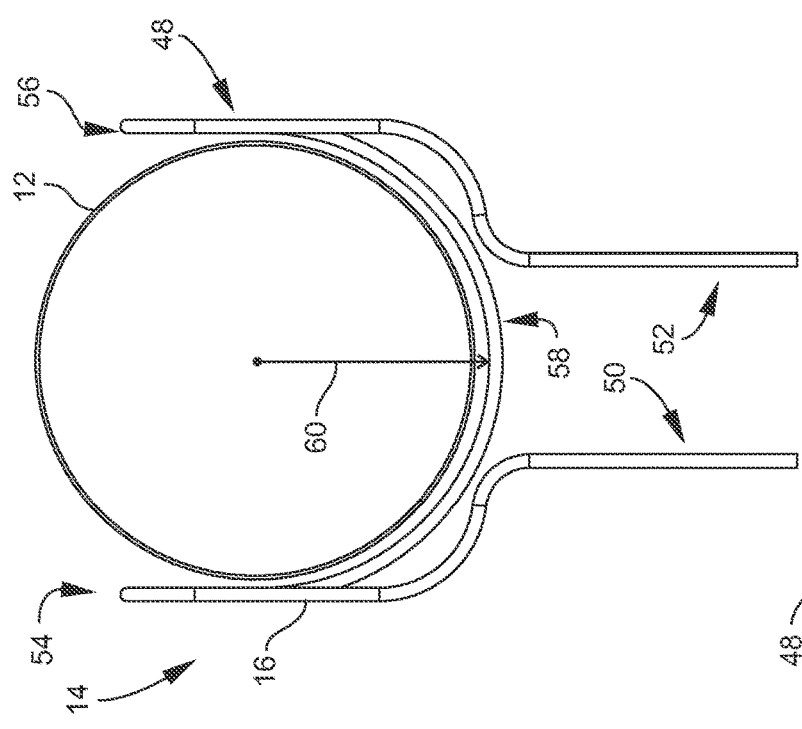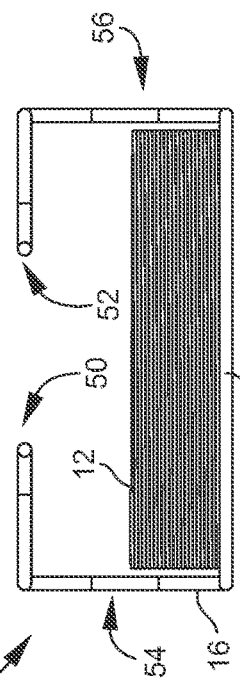
FIG. 23
FIG. 24

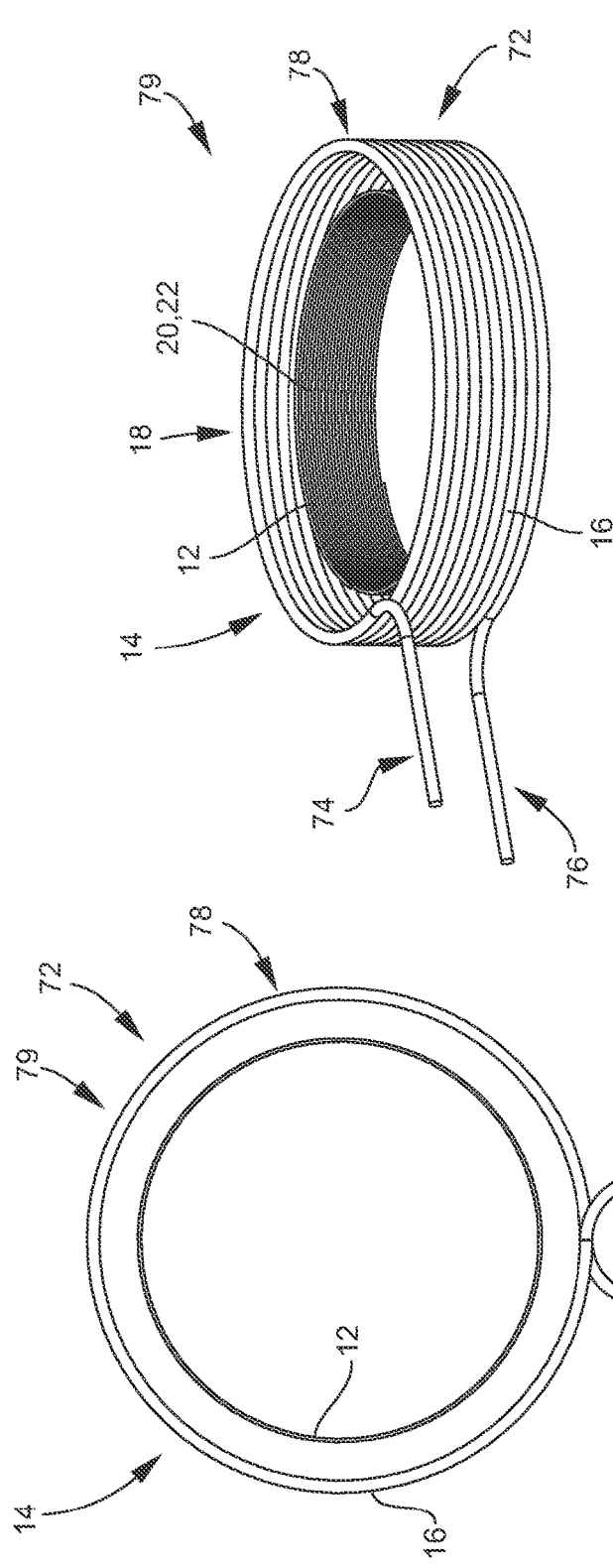
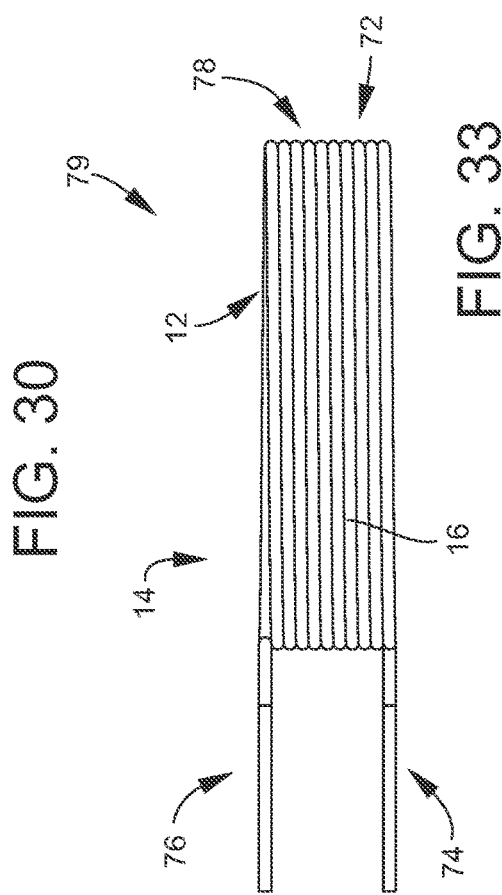
FIG. 30
FIG. 33
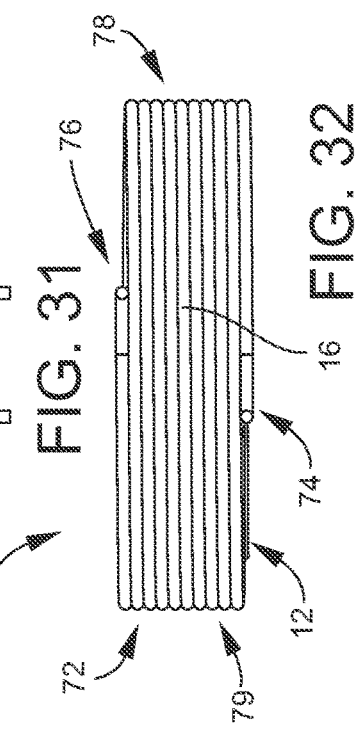
FIG. 31
FIG. 32

GAS CHROMATOGRAPH DEVICE WITH INDUCTIVELY HEATED COLUMN AND METHOD OF USE THEREOF

CROSS-REFERENCE TO RELATED APPLICATIONS

This application claims benefit of priority application, U.S. Provisional Ser. No. 62/537,803 filed on Jul. 27, 2017 entitled "Gas Chromatograph (GC) With At Least A Removable Column Holder, Positioning System for The Inlet Liner And The Column, Column Recognition Technology, Inductively Heated Column and/or Miniaturized Dimensions", which is incorporated herein by reference in its entirety.

FIELD OF THE DISCLOSURE

The present disclosure is directed to gas chromatographs, also known as GCs. More specifically, the instant disclosure is directed to a gas chromatograph or GC with an inductively heated column.

BACKGROUND

Gas chromatography (GC) is a common type of chromatography used in analytical chemistry for separating and analyzing compounds that can be vaporized without decomposition. Gas chromatography is also sometimes known as vapor-phase chromatography (VPC), or gas-liquid partition chromatography (GLPC). Typical uses of GC may include testing the purity of a particular substance, or separating the different components of a mixture, and determining the relative amounts of different components of a mixture. As a result, in some situations, GC may be useful in identifying a compound. As another example, in preparative chromatography, GC can be used to prepare pure compounds from a mixture.

In gas chromatography, the mobile phase (or "moving phase") is a carrier gas, usually an inert gas such as helium or an unreactive gas such as nitrogen. Helium remains the most commonly used carrier gas in most common instruments, however hydrogen is preferred for improved separations. The stationary phase is a microscopic layer of liquid or polymer on an inert solid support, inside a piece of tubing (typically glass or metal) called a column. The instrument used to perform gas chromatography is called a gas chromatograph (also known as an "aerograph" or "gas separator").

The gaseous compounds being analyzed interact with the walls of the column, which is coated with a stationary phase. This causes each compound to elute at a different time, known as the retention time of the compound. The comparison of retention times is what gives GC its analytical usefulness.

Gas chromatography is, in principle, like column chromatography (as well as other forms of chromatography, such as HPLC, TLC), but has several notable differences. First, the process of separating the compounds in a mixture is carried out between a liquid stationary phase and a gas mobile phase. On the other hand, in column chromatography the stationary phase is a solid and the mobile phase is a liquid. Therefore, the full name of the procedure is "gas-liquid chromatography", referring to the mobile and stationary phases, respectively. Second, the column, through which the gas phase passes, is located in an oven where the temperature of the gas can be controlled. On the other hand, standard column chromatography typically has no such temperature control. Finally, the concentration of a compound in the gas phase is solely a function of the vapor pressure of the gas. Gas chromatography is also like fractional distillation, since both processes separate the components of a mixture primarily based on boiling point (or vapor pressure) differences. However, fractional distillation is typically used to separate components of a mixture on a large scale, whereas GC can be used on a much smaller scale (i.e. microscale).

One problem that has been discovered with known gas chromatographs is their size, cost, and ease of use, as known gas chromatographs are typically laboratory grade. Currently, laboratory grade gas chromatographs are large expensive machines that require extensive training for operation. This leads to gas chromatographs being found mainly in academia or industrial labs. For example, in research universities, where each university may only have one gas chromatograph located in a designated area or even room, that is shared among many departments, thereby requiring users to schedule time with the gas chromatograph and its operator(s). This problem may be similar in most industrial labs as well. As such, to provide better access to GC, there is clearly a need to provide a gas chromatograph that is smaller, costs less, and is easier to use.

The instant disclosure is directed toward a gas chromatograph with inductive heating. As such, the instant disclosure provides a gas chromatograph system that may provide an inductively heated column. For many years prior to the instant disclosure, inductively heatable columns, like metal or silica columns, were not used or common, meaning that inductive heating could not have even worked on these previous columns. As such, traditionally, prior to the instant disclosure, GC columns were hung in a convection oven that resides within the GC. Thus, convection heating via air ovens and resistive elements have been the norm. However, these ovens require large spaces and thus take time to heat these spaces up. As such, there is clearly a need to reduce the time and space required for these convection heating ovens required for gas chromatograph columns.

The instant disclosure is designed to address at least certain aspects of the problems or needs discussed above by providing a gas chromatograph with at least an inductively heated column.

SUMMARY

Accordingly, in one aspect, the present disclosure embraces a gas chromatograph device that includes an inductively heated column. The gas chromatograph device may generally include a column that is configured for gas chromatography and an inductive heating source. The inductive heating source may be configured to directly or indirectly heat the column. The inductive heating source may include an inductive heating element or coil. The inductive heating element or coil may be configured to induce a current directly or indirectly in the column. Wherein, the column in the gas chromatograph device may be inductively heated via the inductive heating source.

One feature of the instant gas chromatograph device may be that it does not require an oven to heat the column. This feature may allow the gas chromatograph to have reduced dimensions. This feature may also reduce the time for heating and/or cooling of the column.

Another feature of the gas chromatograph device of the instant disclosure may be that the inductive heating element or coil may be configured to induce a current directly into a skin of an outer layer of the column which may be a metal or silica column configured for gas chromatography. In select possibly preferred embodiments, the column may be a metal column.

In select embodiments of the instant gas chromatograph device, the inductive heating element or coil may be configured to directly heat the column controllably up to a needed temperature and hold the column at the needed temperature.

In select embodiments of the instant gas chromatograph device at least one fan may be included. Wherein, the inductive heating element or coil may be configured to allow the gas chromatograph to cool the column by turning off the inductive heating element or coil and blowing or fanning cool air over the column via the at least one fan.

In select embodiments of the instant gas chromatograph device a temperature sensor may be included. The temperature sensor may be configured for noncontact, direct temperature measurement of the column. Wherein, the temperature sensor may be configured to read a surface temperature of a surface of the column without touching the column. In select embodiments, the inductive heating source may be configured to be controlled by the temperature sensor, wherein the inductive heating of the column may be controlled by the noncontact, direct temperature measurement of the column. In select embodiments, the temperature sensor may be an infrared temperature sensor.

In select embodiments of the instant gas chromatograph device, the inductive heating element or coil may be a flat square coil. The flat square coil may include a square inlet portion, a square outlet portion, and a plurality of linear coil rows. The linear coil rows may form a square or rectangular shape between the square inlet portion and the square outlet portion. Wherein, the plurality of linear coil rows may be positioned above, below or to the side of the column for inductively heating the column with the flat square coil. In select possibly preferred embodiments, the plurality of linear coil rows of the flat square coil may be positioned below the column.

In select embodiments of the instant gas chromatograph device, the inductive heating element or coil may be a knuckle coil. The knuckle coil may include a knuckle inlet portion, a knuckle outlet portion, a first curled knuckle portion, a second curled knuckle portion, and a curved portion. The first curled knuckle portion may be connected to the knuckle inlet portion and may be configured to extend from above the column to below the column on a first side. The second curled knuckle portion may be connected to the knuckle outlet portion and may be configured to extend from above the column to below the column on a second side. The curved portion may be configured to connect the first curled knuckle portion to the second curled knuckle portion. Wherein, the curved portion may have a radius configured to go around the column in the removable column holder. Wherein, the column may be configured to fit between the knuckle inlet and outlet portions, and the curved portion for inductively heating the column with the knuckle coil.

In select embodiments of the instant gas chromatograph device, the inductive heating element or coil may be a pancake coil. The pancake coil may include a pancake inlet portion, a pancake outlet portion, and a plurality of enlarging circular coils inside one another forming a pancake shape between the pancake inlet portion and the pancake outlet portion. Wherein, the plurality of enlarging circular coils may be positioned above, below or to the side of the column for inductively heating the column with the pancake coil. In select possibly preferred embodiments, the plurality of enlarging circular coils of the pancake coil may be positioned below the column.

In select embodiments of the instant gas chromatograph, the inductive heating element or coil may be a round coil. The round coil may include a round inlet portion, a round outlet portion, and a plurality of tubular coils forming a tube shape between the round inlet portion and the round outlet portion. Wherein, the plurality of tubular coils may be configured to be placed around or inside the column for inductively heating the column with the round coil. In select possibly preferred embodiments, the plurality of tubular coils of the round coil may be positioned around the column.

In select embodiments, the instant gas chromatograph device may further include a frame.

In select embodiments, the instant gas chromatograph device may further include a cover.

In select embodiments, the instant gas chromatograph device may further include an injection port.

In select embodiments, the instant gas chromatograph device may further include gas fittings in fluid communication with the injection port.

In select embodiments, the instant gas chromatograph device may further include a cartridge slot. The cartridge slot may be configured to receive a removable column holder with the column, wherein the inductive heating source may be positioned above, below, or around the cartridge slot. In select possibly preferred embodiments, the inductive heating source may be positioned below the cartridge slot. In select embodiments, the instant gas chromatograph device may further include a locking mechanism for securing the removable column holder inside the cartridge slot.

In select embodiments, the instant gas chromatograph device may further include a detector.

In select embodiments, the instant gas chromatograph device may further include at least one vent hole. The vent holes may be in the cover. The vent holes may be configured for providing air flow through the column via the at least one fan.

In select embodiments of the instant gas chromatograph device, the column in the removable column holder may include an injector port pin and a detector pin. The injector port pin may be in fluid communication with the injection port. The detector pin may be in fluid communication with the detector.

In select embodiments of the instant gas chromatograph device, the removable column holder may include a housing. The housing may have a plurality of holes, vents, slots, or combinations thereof configured for air flow through the column. The housing may also have a tab configured for gripping the removable column holder for inserting and removing the removable column holder from the cartridge slot.

In select embodiments of the instant gas chromatograph device, a detector o-ring and an injector port o-ring may be included with the removable column holder. The detector o-ring may be configured for sealing the detector pin of the column to the detector (or lines thereto) when the removable column holder is inserted and locked in the cartridge slot. Likewise, the injector o-ring may be configured for sealing the injector port pin of the column to the injector port (or lines thereto) when the removable column holder is inserted and locked in the cartridge slot.

In another aspect, the instant disclosure embraces a method of inductively heating a gas chromatograph column in a gas chromatograph device. The method generally includes the step of providing the gas chromatograph device of the instant disclosure in any of the various embodiments shown and/or described herein. As such, the gas chromatograph device may be provided with at least the column configured for gas chromatography, and the inductive heating source configured to directly or indirectly heat the column, where the inductive heating source includes an inductive heating element or coil, and the inductive heating element or coil is configured to induce a current directly or indirectly in the column. Accordingly, the method of inductively heating a gas chromatograph column in a gas chromatograph device may further include the step of heating the column via the inductive heating source.

One feature of the instant method of inductively heating a gas chromatograph column in a gas chromatograph device, is that the step of inductively heating the column may not require an oven.

In select embodiments of the instant method of inductively heating a gas chromatograph column in a gas chromatograph device, the method may further include the steps of: directly heating the column controllably up to a needed temperature and holding the column at the needed temperature; allowing the gas chromatograph to cool the column by turning off the inductive heating element or coil and blowing or fanning cool air over the column via at least one fan; measuring the temperature of the column with a temperature sensor configured for noncontact, direct measurement of the column temperature; and controlling the inductive heating of the column via the noncontact, direct temperature measurement of the column.

The foregoing illustrative summary, as well as other exemplary objectives and/or advantages of the disclosure, and the manner in which the same are accomplished, are further explained within the following detailed description and its accompanying drawings.

BRIEF DESCRIPTION OF THE DRAWINGS

The present apparatuses, systems and methods will be better understood by reading the Detailed Description with reference to the accompanying drawings, which are not necessarily drawn to scale, and in which like reference numerals denote similar structure and refer to like elements throughout, and in which:

FIG. 18 is a perspective top view of select embodiments of a flat square coil for inductively heating the column of the miniature GC according to select embodiments of the instant disclosure;

FIG. 19 is a top view of the flat square coil of FIG. 18 for inductively heating the column of the miniature GC according to the instant disclosure;

FIG. 20 is a front view of the flat square coil of FIG. 18 for inductively heating the column of the miniature GC according to the instant disclosure;

FIG. 21 is a side view of the flat square coil of FIG. 18 for inductively heating the column of the miniature GC according to the instant disclosure;

FIG. 22 is a top perspective view of select embodiments of a knuckle coil for inductively heating the column of the miniature GC according to select embodiments of the instant disclosure;

FIG. 23 is a top view of the knuckle coil of FIG. 22 for inductively heating the column of the miniature GC according to the instant disclosure;

FIG. 24 is a front view of the knuckle coil of FIG. 22 for inductively heating the column of the miniature GC according to the instant disclosure;

FIG. 25 is a side view of the knuckle coil of FIG. 22 for inductively heating the column of the miniature GC according to the instant disclosure;

FIG. 30 is a top perspective view of select embodiments of a round coil for inductively heating the column of the miniature GC according to select embodiments of the instant disclosure;

FIG. 31 is a top view of the round coil of FIG. 30 for inductively heating the column of the miniature GC according to the instant disclosure;

FIG. 32 is a front view of the round coil of FIG. 30 for inductively heating the column of the miniature GC according to the instant disclosure; and FIG. 33 is a side view of the round coil of FIG. 30 for inductively heating the column of the miniature GC according to the instant disclosure.

Figure 1:
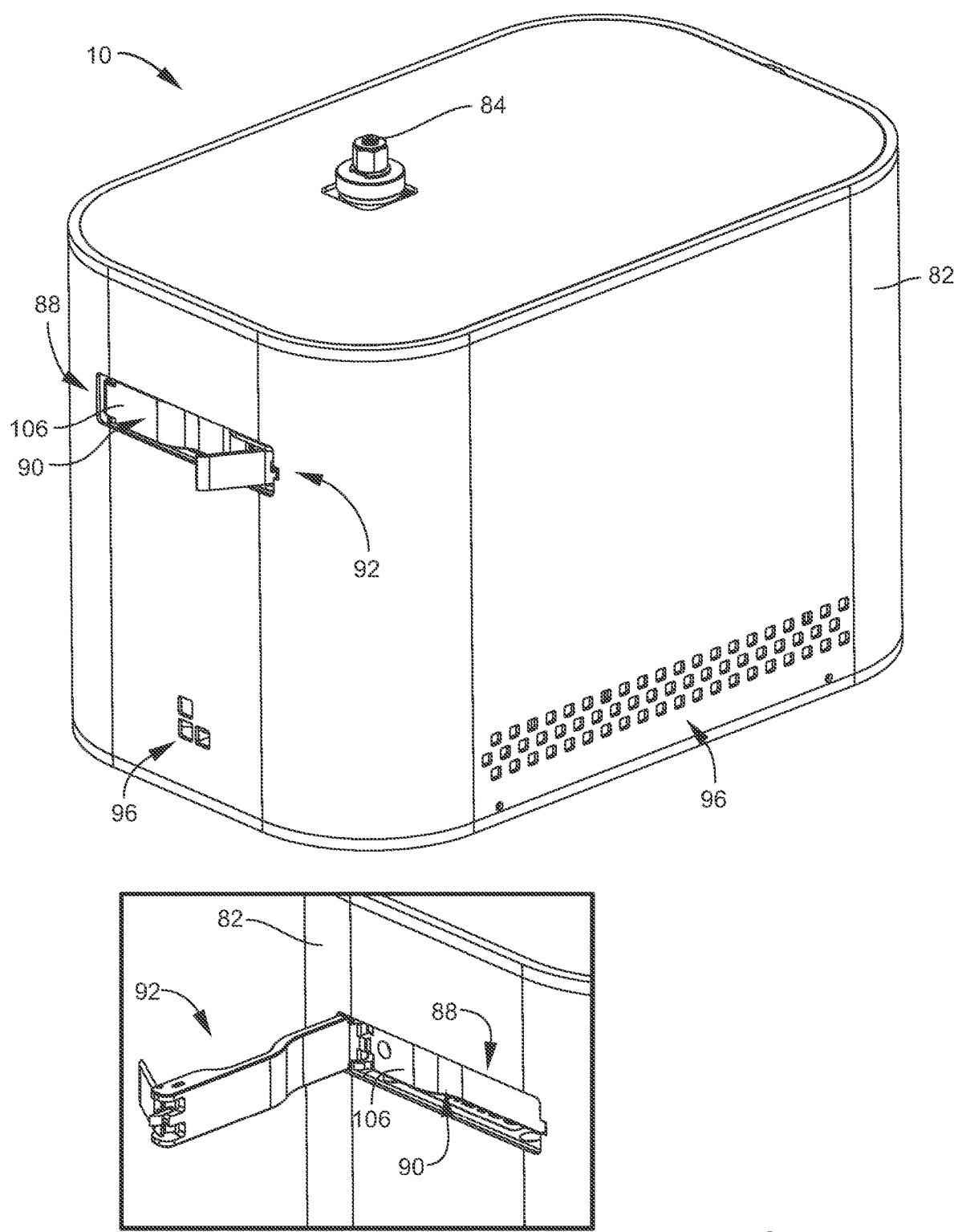
FIG. 1 is perspective front top view of select embodiments of the gas chromatograph device according to the instant disclosure with the locking mechanism locked and unlocked below.

It is to be noted that the drawings presented are intended solely for the purpose of illustration and that they are, therefore, neither desired nor intended to limit the disclosure to any or all of the exact details of construction shown, except insofar as they may be deemed essential to the claimed disclosure.

DETAILED DESCRIPTION

Referring now to FIGS. 1-34, in describing the exemplary embodiments of the present disclosure, specific terminology is employed for the sake of clarity. The present disclosure, however, is not intended to be limited to the specific terminology so selected, and it is to be understood that each specific element includes all technical equivalents that operate in a similar manner to accomplish similar functions. Embodiments of the claims may, however, be embodied in many different forms and should not be construed to be limited to the embodiments set forth herein. The examples set forth herein are non-limiting examples and are merely examples among other possible examples.

Referring now to FIGS. 1-33, in a possibly preferred embodiment, the present disclosure overcomes the above-mentioned disadvantages and meets the recognized need for such an apparatus or method by providing of gas chromatograph device 10. Gas chromatograph device 10 may be referred to herein as gas chromatograph, miniature gas chromatograph, mini gas chromatograph, miniature GC, mini GC, or just GC. Gas chromatograph device 10 may be for gas chromatography (GC), or may be used in analytical chemistry for separating and analyzing compounds that can be vaporized without decomposition. As such, gas chromatograph device 10 may be used for, but is not limited to, testing the purity of a particular substance, or separating the different components of a mixture, and determining the relative amounts of different components of a mixture. As a result, in some situations, gas chromatograph device 10 may be useful in identifying a compound. As another example, in preparative chromatography, gas chromatograph device 10 can be used to prepare pure compounds from a mixture.

Gas chromatograph device 10 may be provided with unique features, including, but not limited to, at least removable column holder 90, positioning system for the inlet liner and the column 12, column recognition technology for the column 12, inductive heating of column 12, and/or miniaturized dimensions (see FIGS. 1-16). However, although the instant disclosure may be directed to the inductive heating of column 12, the disclosure is not so limited, and gas chromatograph device 10 may include these other unique features as well.

In general, the instant disclosure is directed to gas chromatograph device 10 that includes inductively heated column 12. As such, the gas chromatograph device 10 may generally include column 12 that is configured for gas chromatography, and inductive heating source 14. The inductive heating source 14 may be configured to directly or indirectly heat column 12. As disclosed herein, direct inductive heating of column 12 would be applying an inductive current directly to column 12 for heating column 12. On the other hand, as disclosed herein, indirect inductive heating of column 12 would be applying an inductive current to a material or device around column 12 for heating column 12. The inductive heating source 14 may include inductive heating element or coil 16. As such, the inductive heating element or coil 16 may be configured to induce current 18 directly or indirectly in column 12. Wherein, column 12 in the gas chromatograph device 10 may be inductively heated via inductive heating source 14.

One feature or benefit of the instant gas chromatograph device 10 may be that it does not require an oven to heat column 12. Prior to the instant disclosure, GC columns were hung in a convection oven that resides within the GC device. Thus, convection heating via air ovens and resistive elements have been the norm. However, these ovens require large spaces and thus take time to heat these spaces up. The instant disclosure of miniature gas chromatograph device 10 utilized inductive heating of column 12 and, thus, does not include an oven. This feature may reduce the time and space required for these convection heating ovens required for prior gas chromatograph devices. As a result, in one aspect, the instant disclosure is directed to gas chromatograph device 10 that has miniaturized dimensions or miniature gas chromatograph 10. Miniature gas chromatograph 10 may be a gas chromatograph that is smaller in size than known standard gas chromatographs.

Figure 2:
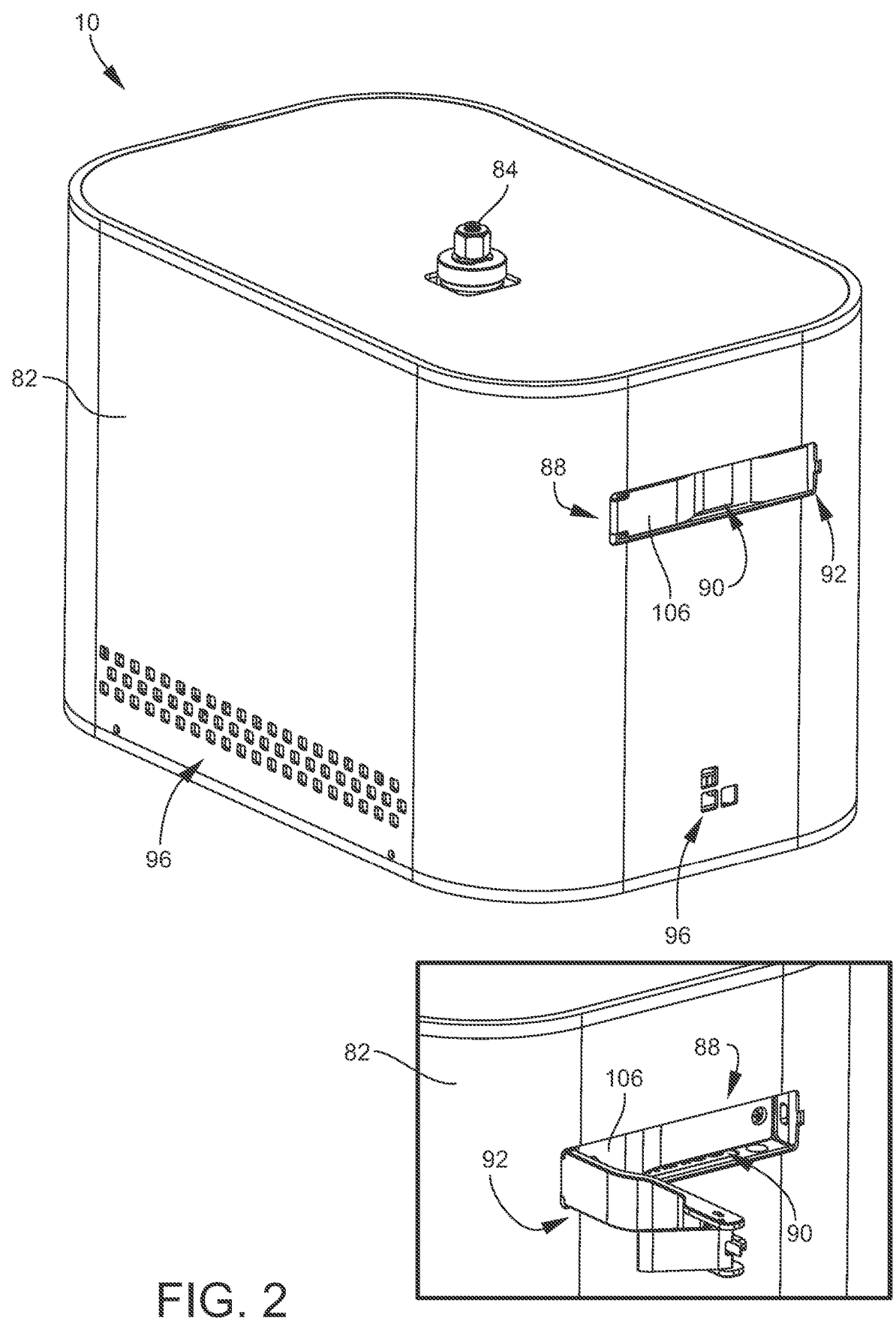
FIG. 2 is another perspective front top view of the gas chromatograph device of FIG. 1 from the other side with the locking mechanism locked and unlocked below.
Figure 3:
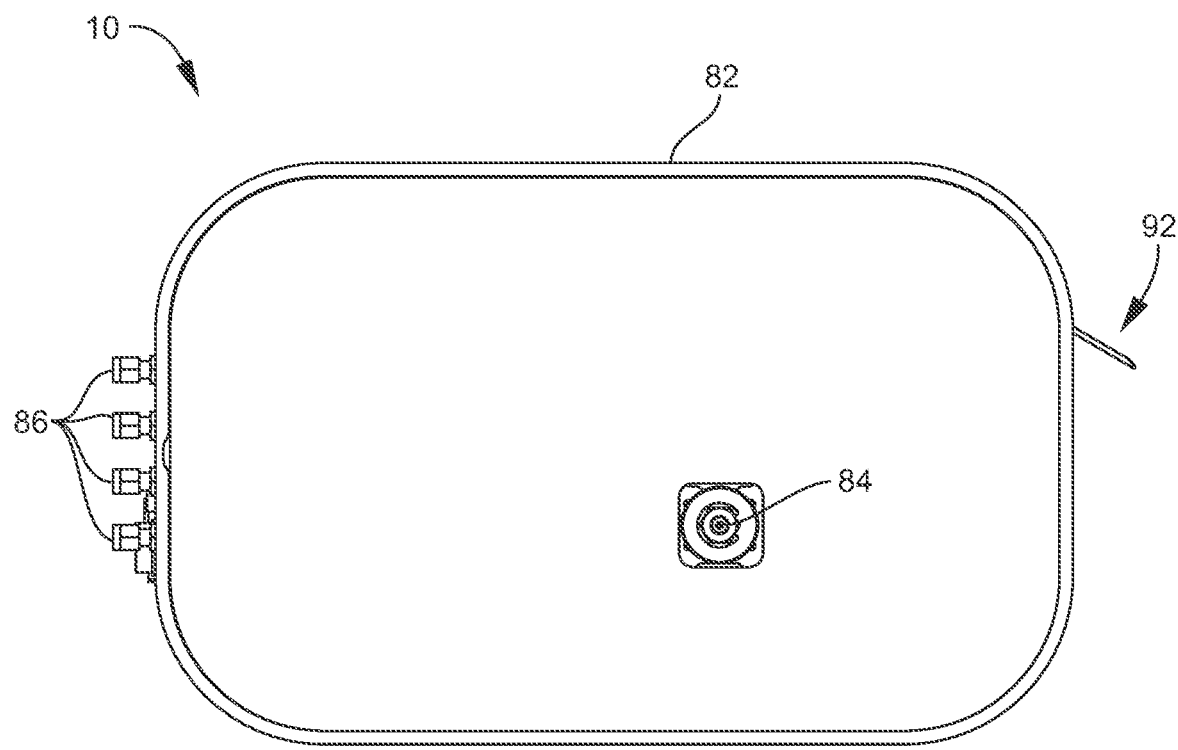
FIG. 3 is a top view of the gas chromatograph device of FIG. 1.
Figure 4:
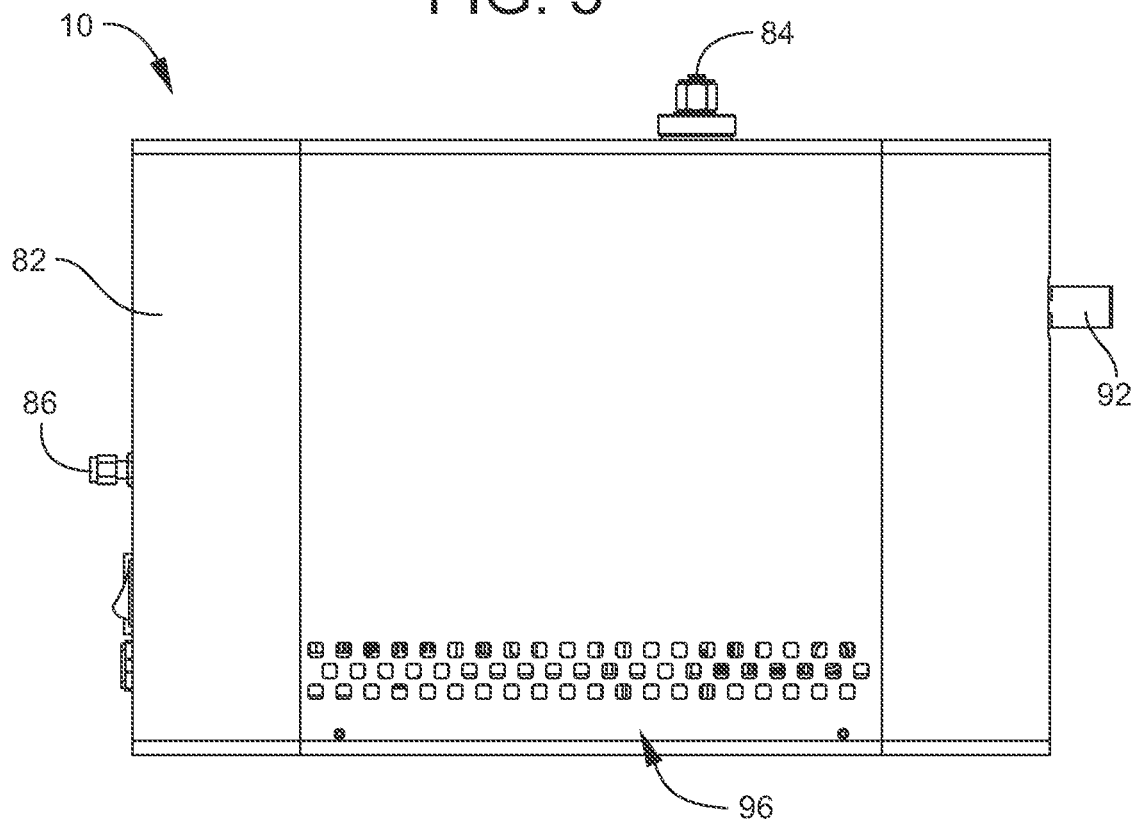
FIG. 4 is a left side view of the gas chromatograph device of FIG. 1.
Figure 5:
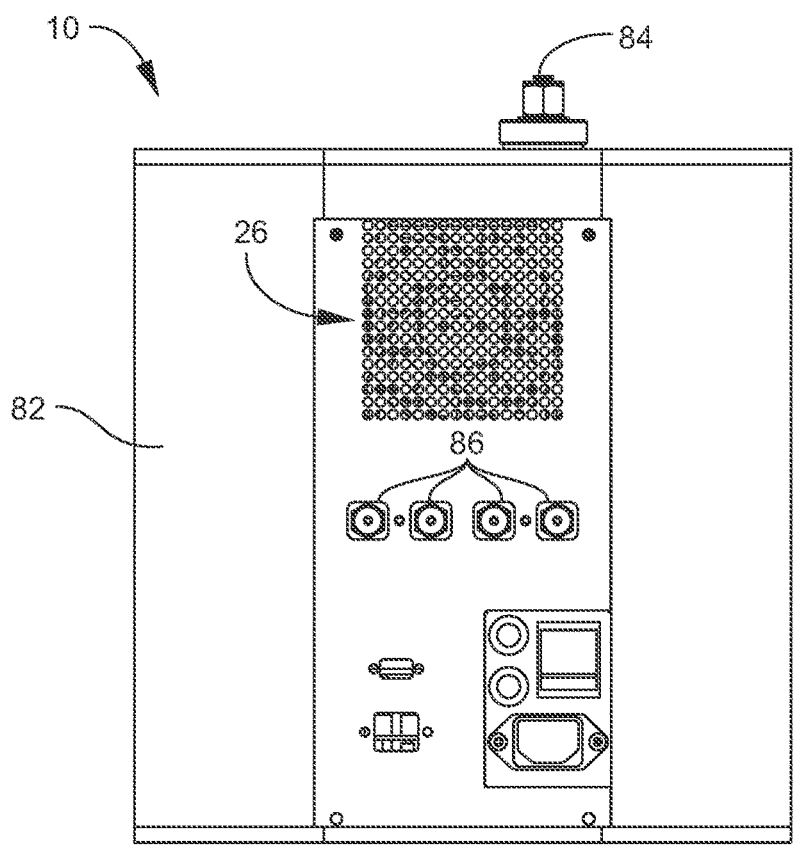
FIG. 5 is a rear view of the gas chromatograph device of FIG. 1.
Figure 6:
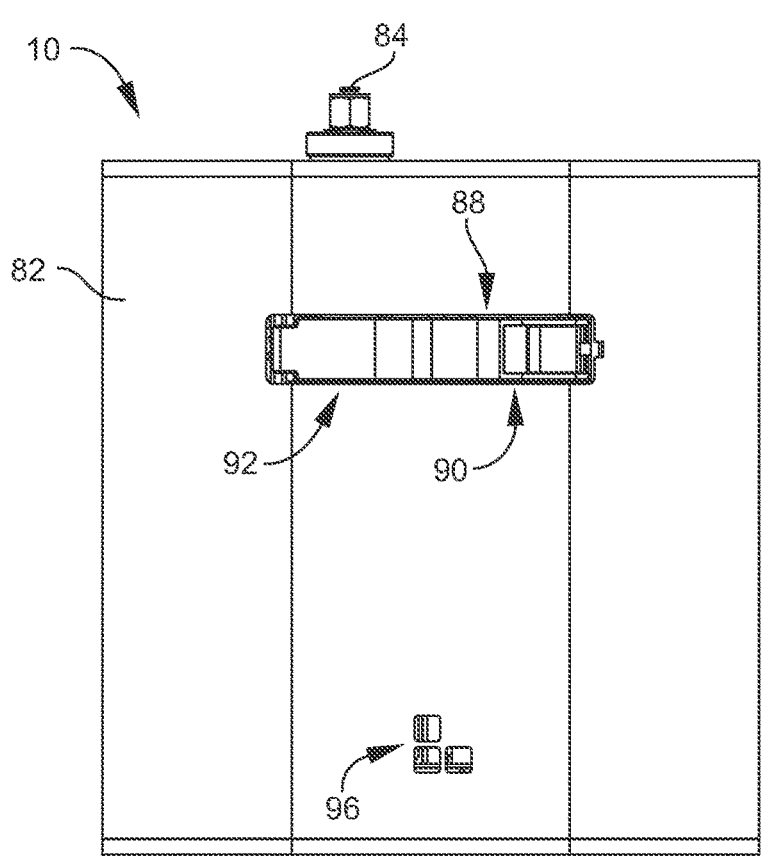
FIG. 6 is a front view of the gas chromatograph device of FIG. 1.
Figure 7:
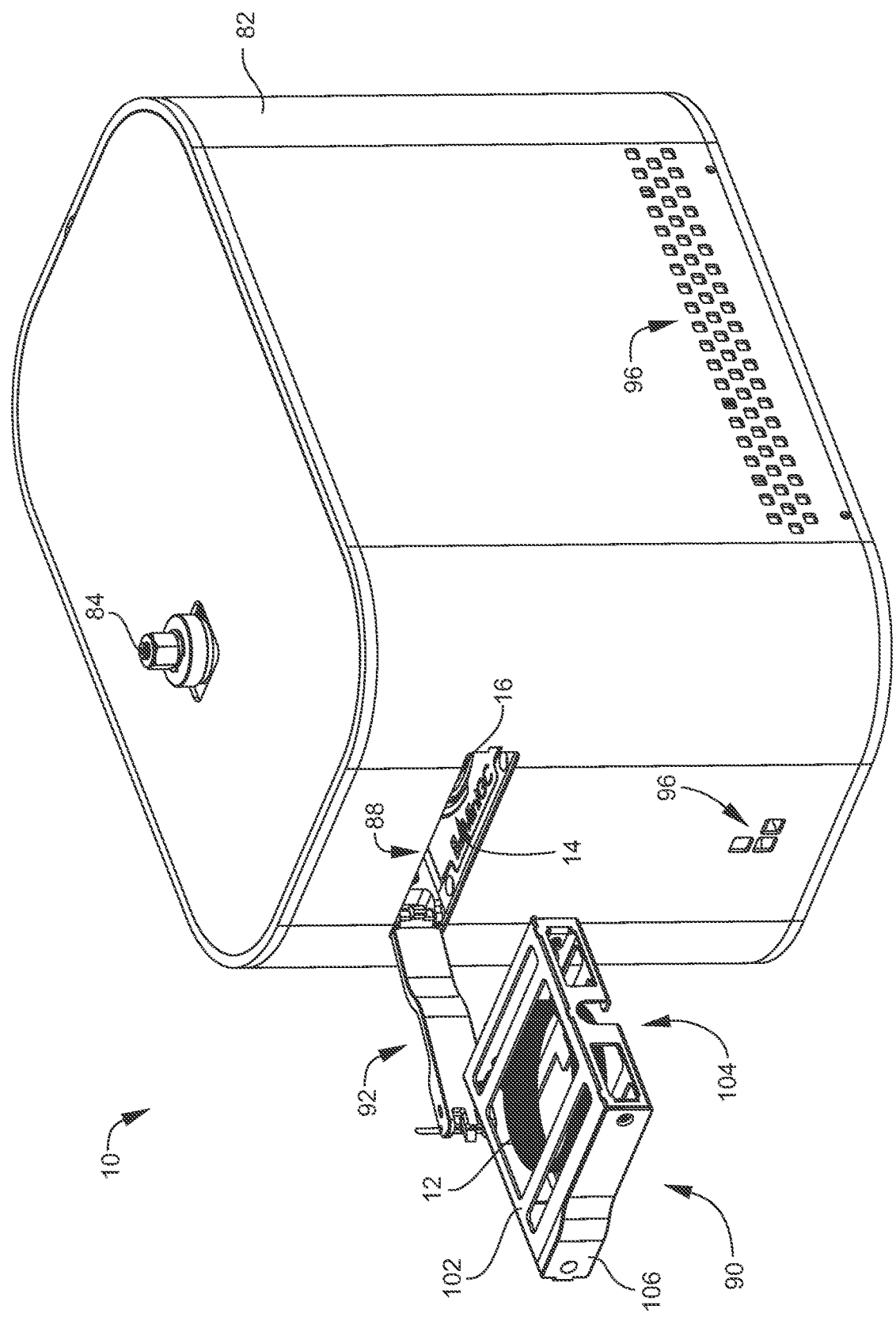
FIG. 7 is a perspective front top view of select embodiments of the gas chromatograph device according to select embodiments with the locking mechanism unlocked and the removable column holder partially removed.
Figure 8:
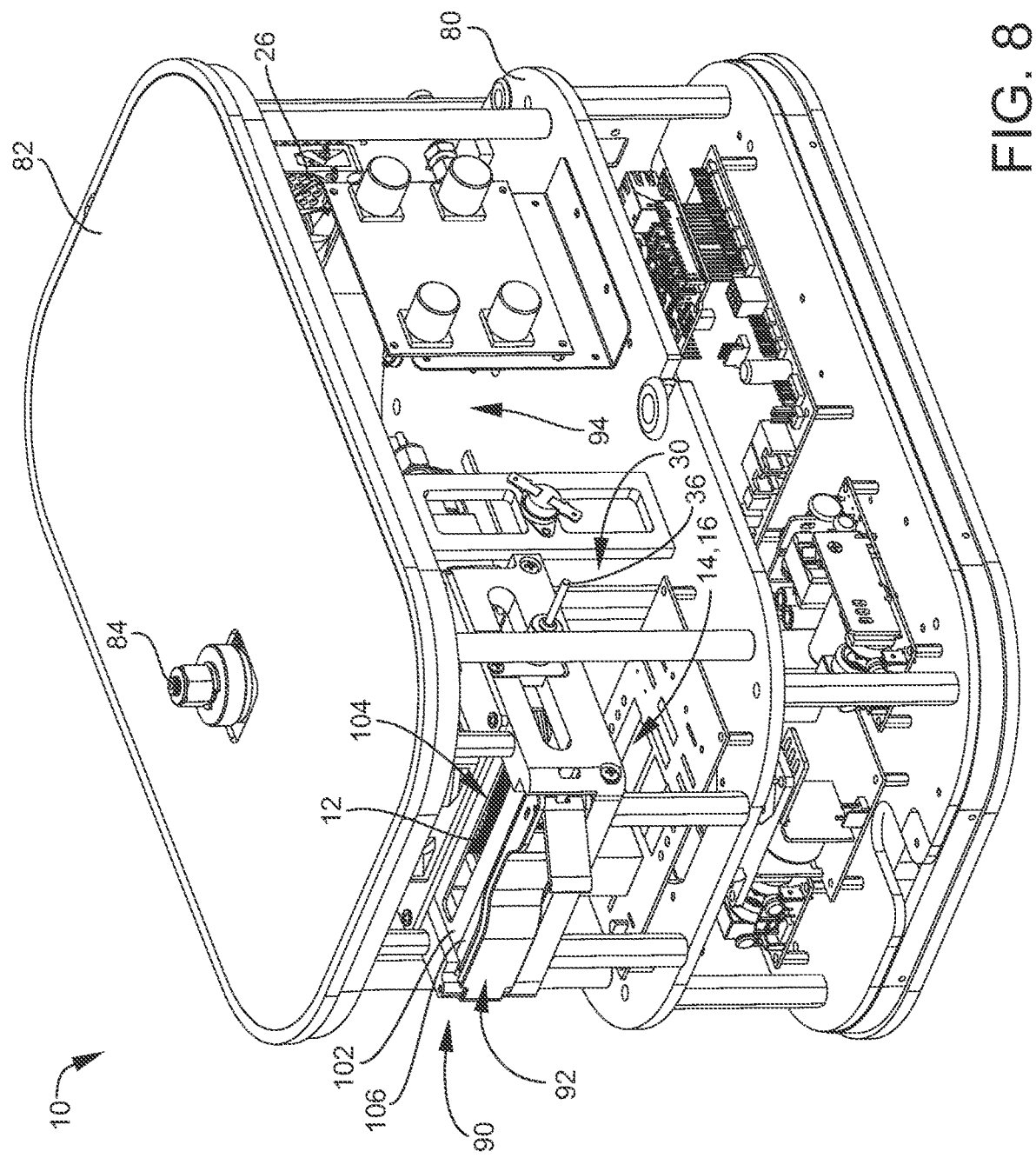
FIG. 8 is perspective front top view of select embodiments of the gas chromatograph device according to the instant disclosure with the cover removed.
Figure 9:
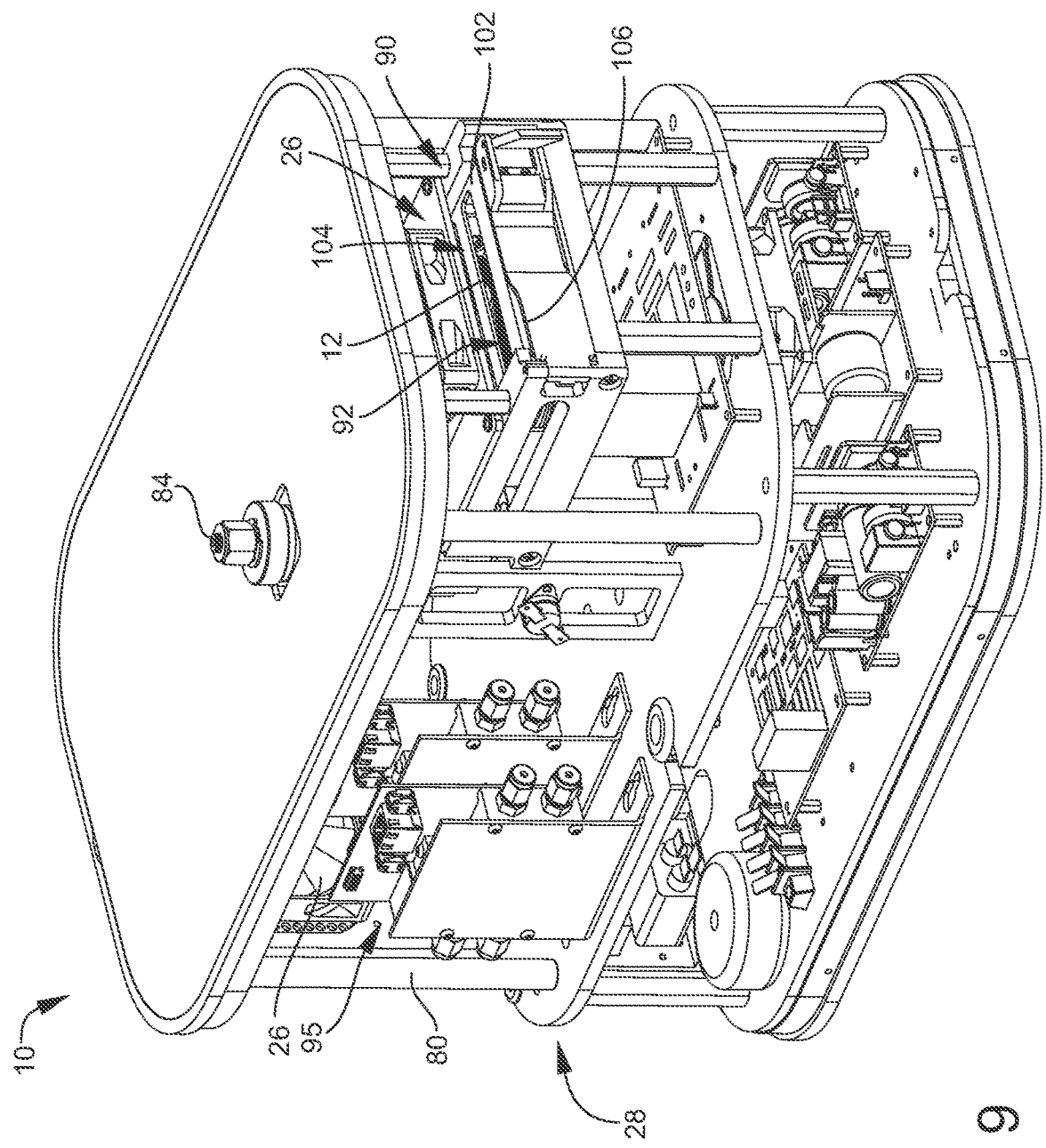
FIG. 9 is another perspective front top view of the gas chromatograph device of FIG. 8 from the other side.
Figure 10:
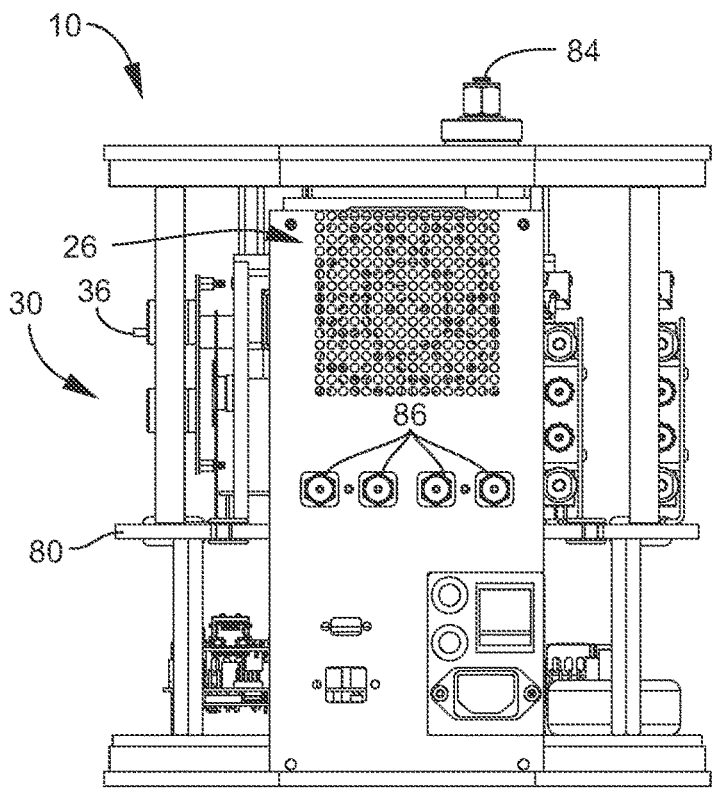
FIG. 10 is a rear view of the gas chromatograph device of FIG. 8.
Figure 11:
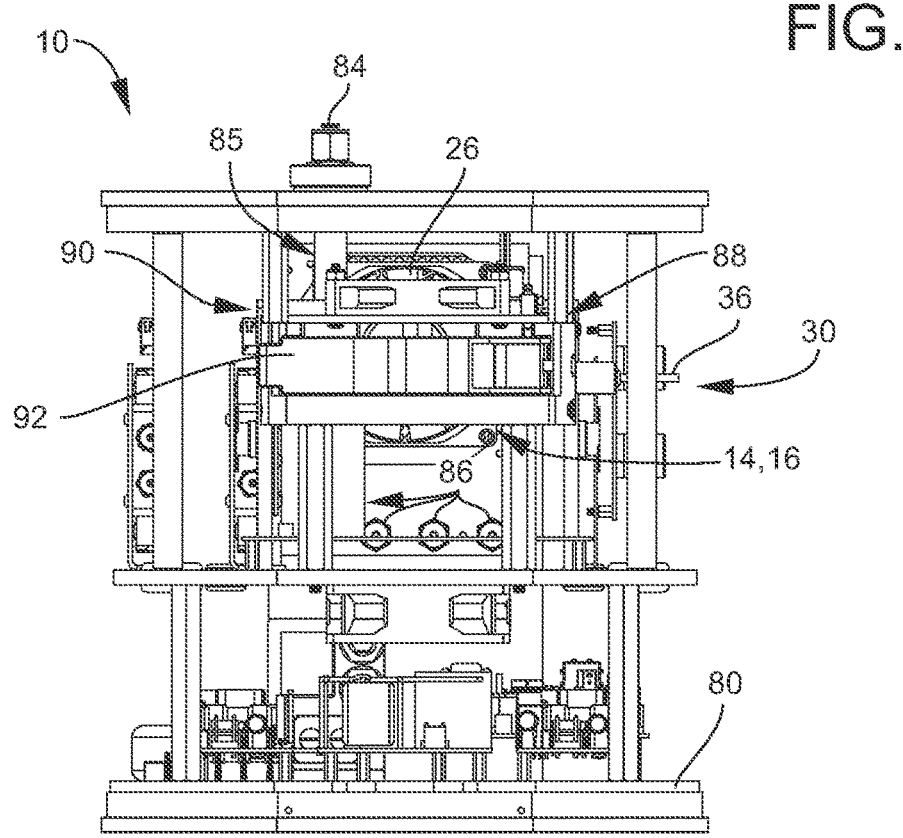
FIG. 11 is a front view of the gas chromatograph device of FIG. 8.
Figure 12:
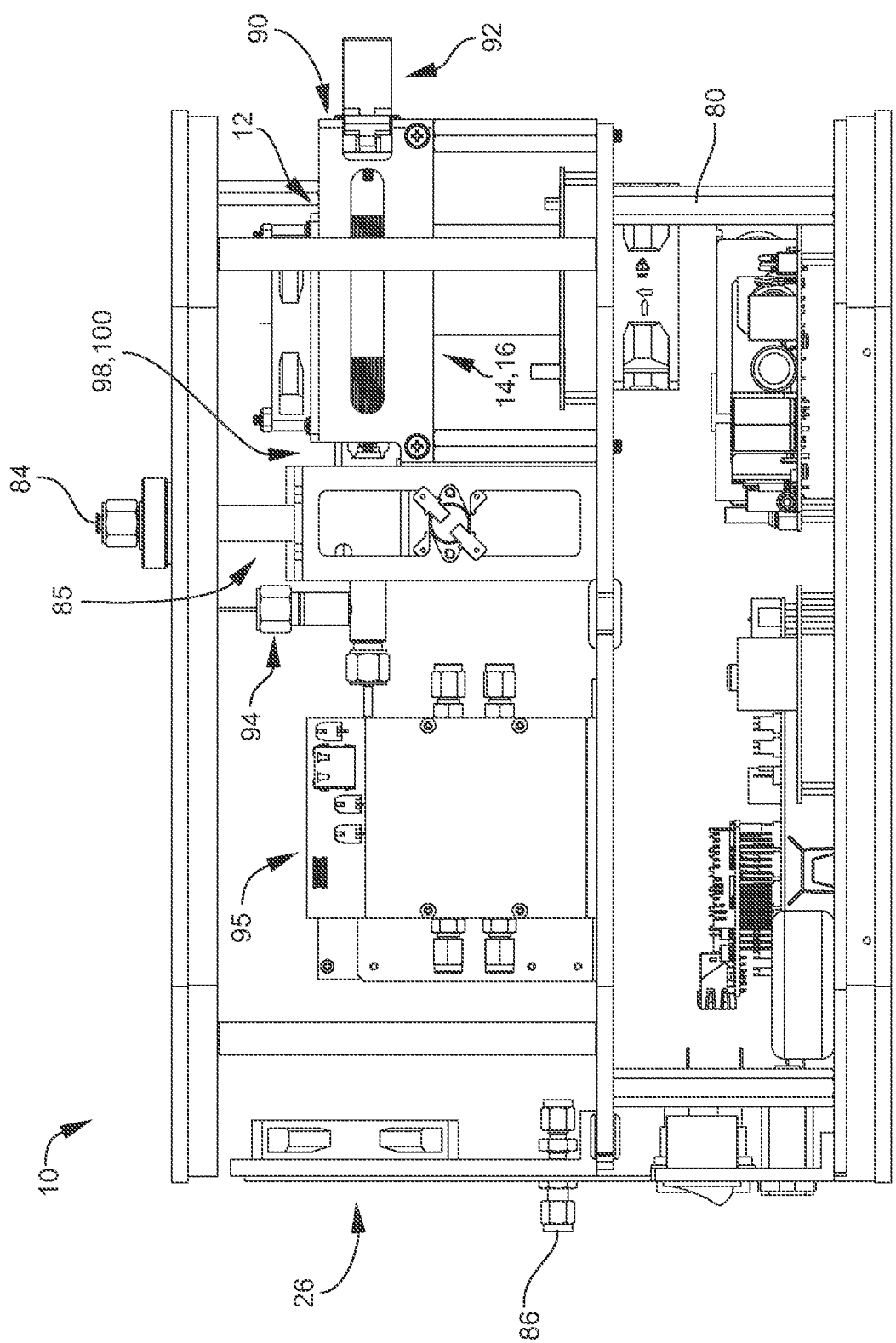
FIG. 12 is a left side view of the gas chromatograph device of FIG. 8.
Figure 13:
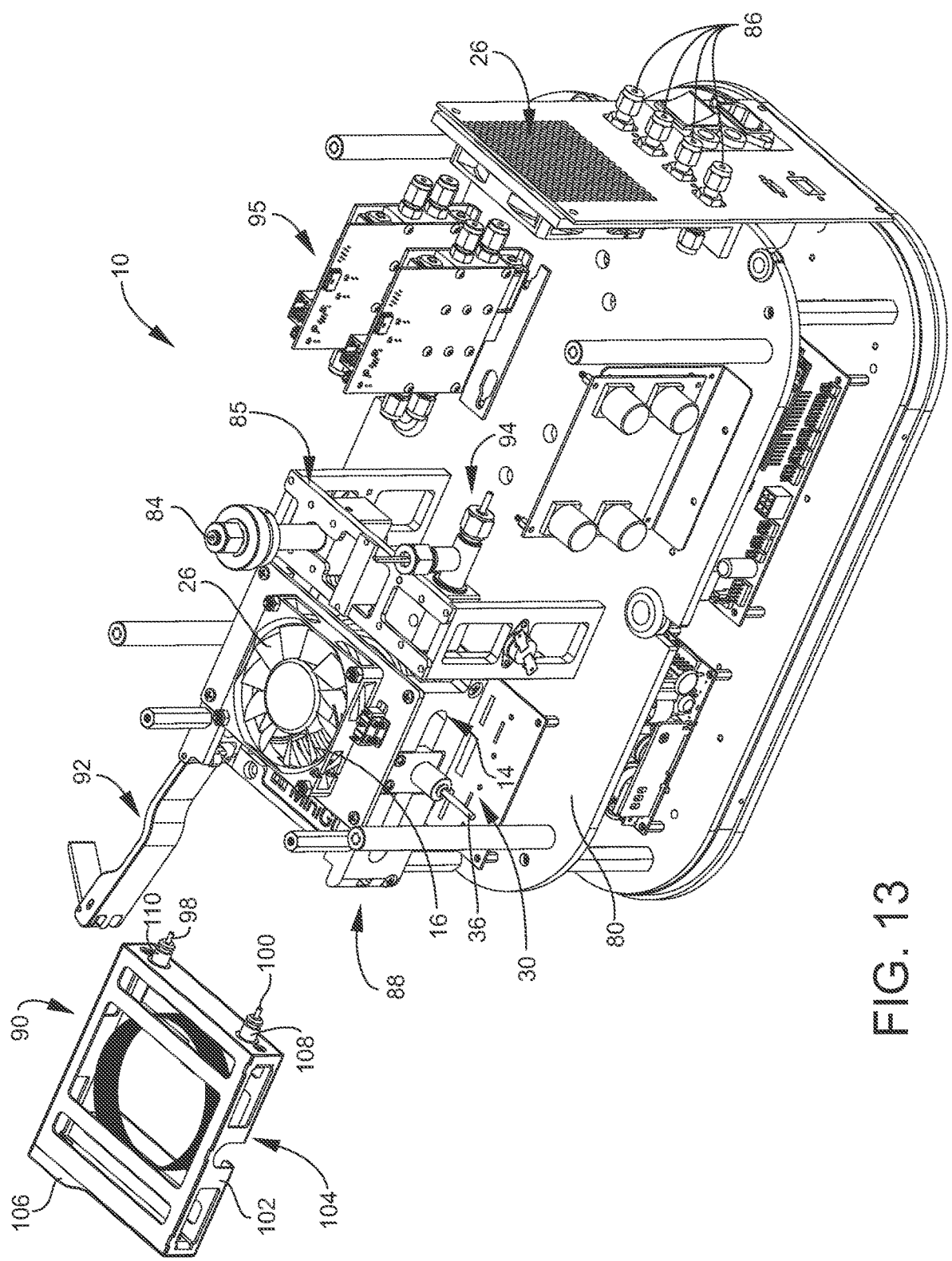
FIG. 13 is a perspective rear top view of select embodiments of the gas chromatograph device according to the instant disclosure without the cover and with the locking mechanism unlocked and the removable column removed.
Figure 14:
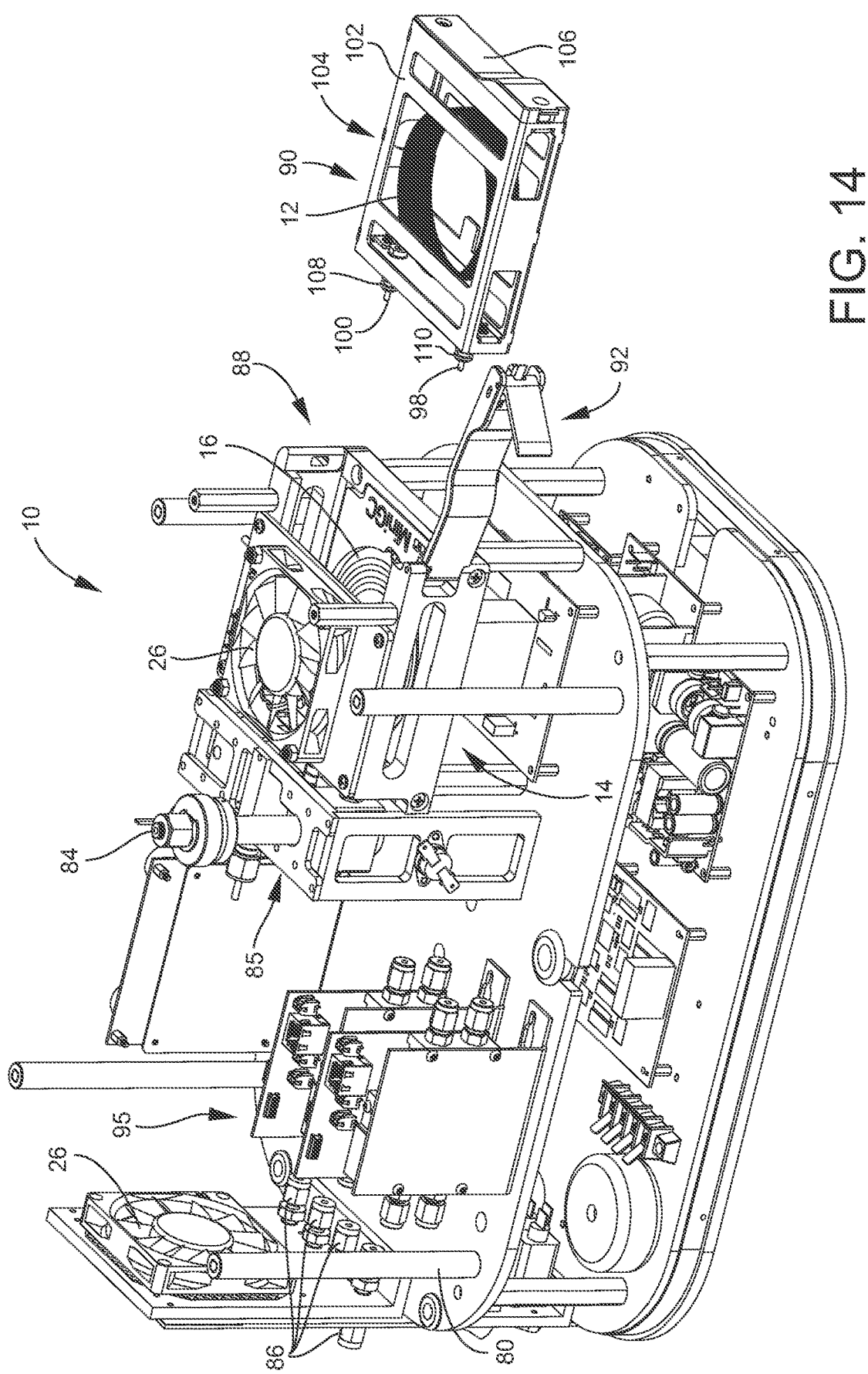
FIG. 14 is a perspective front top view of the gas chromatograph device of FIG. 13.
Figure 15:
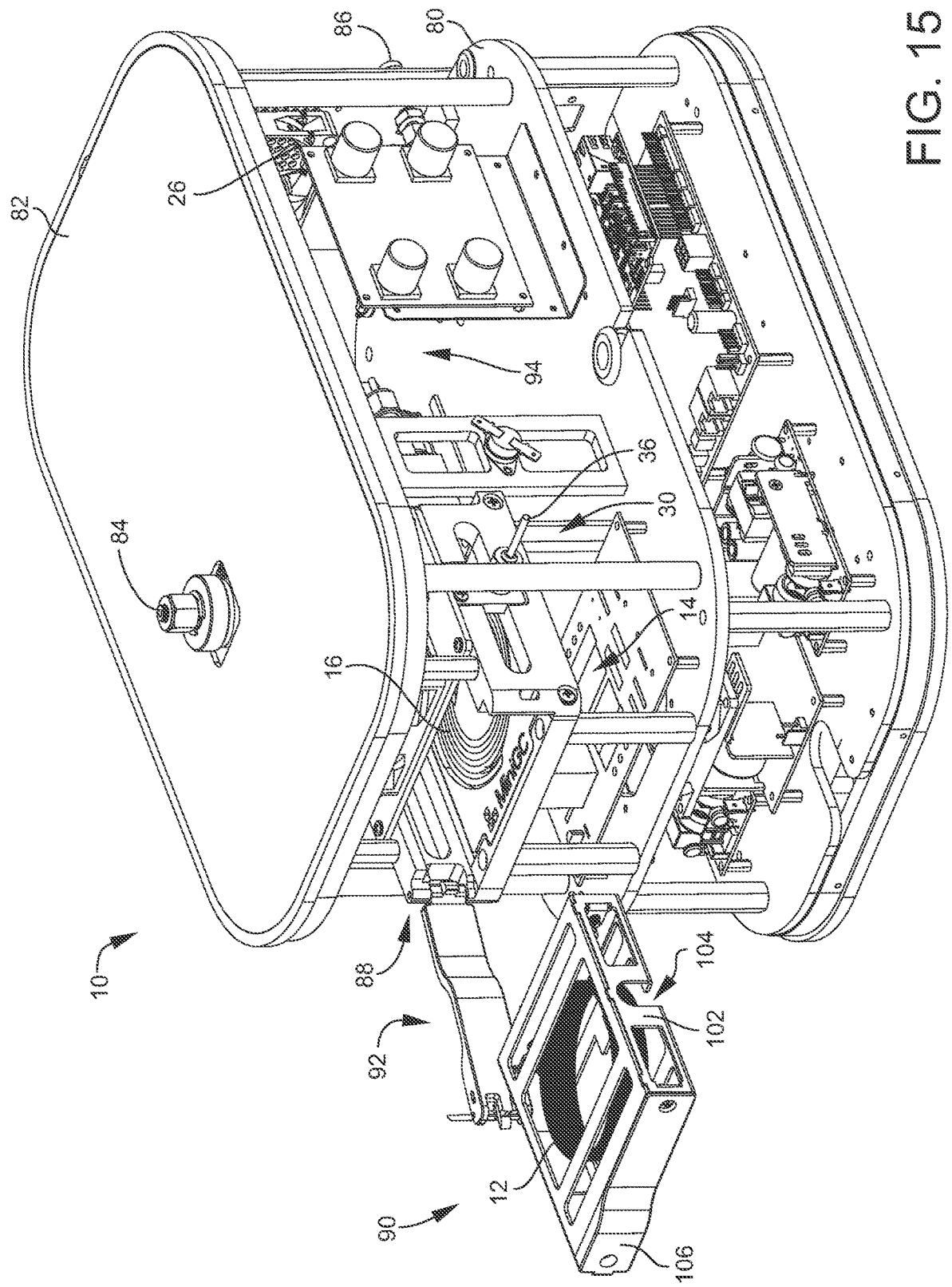
FIG. 15 is a perspective front top view of select embodiments of the gas chromatograph device of FIG. 13 with the cover partially removed except for the top, and with the locking mechanism unlocked and the removable column partially removed.
Figure 16:
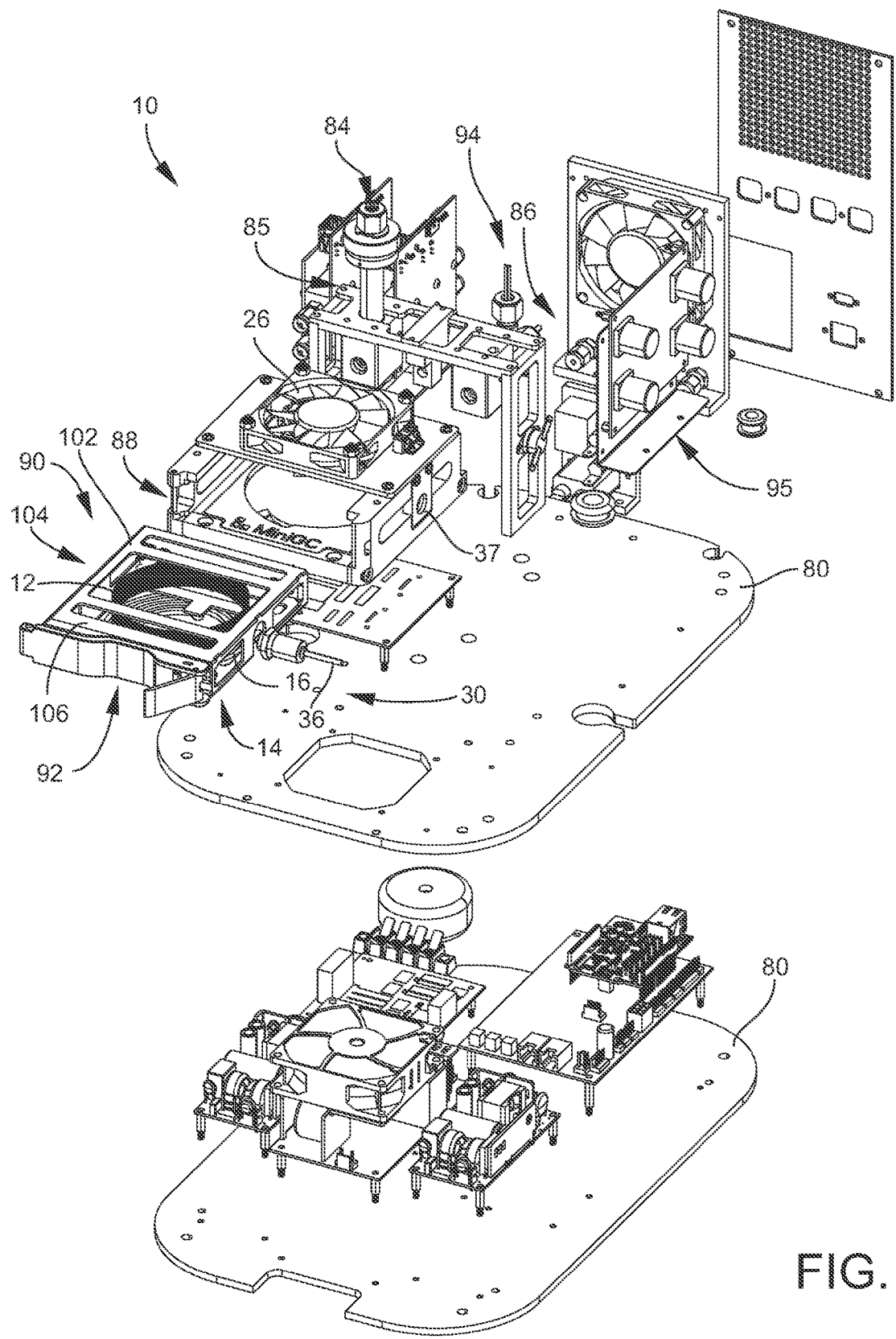
FIG. 16 is a partially disassembled perspective front top view of select embodiments of the gas chromatograph device.
Figure 17:
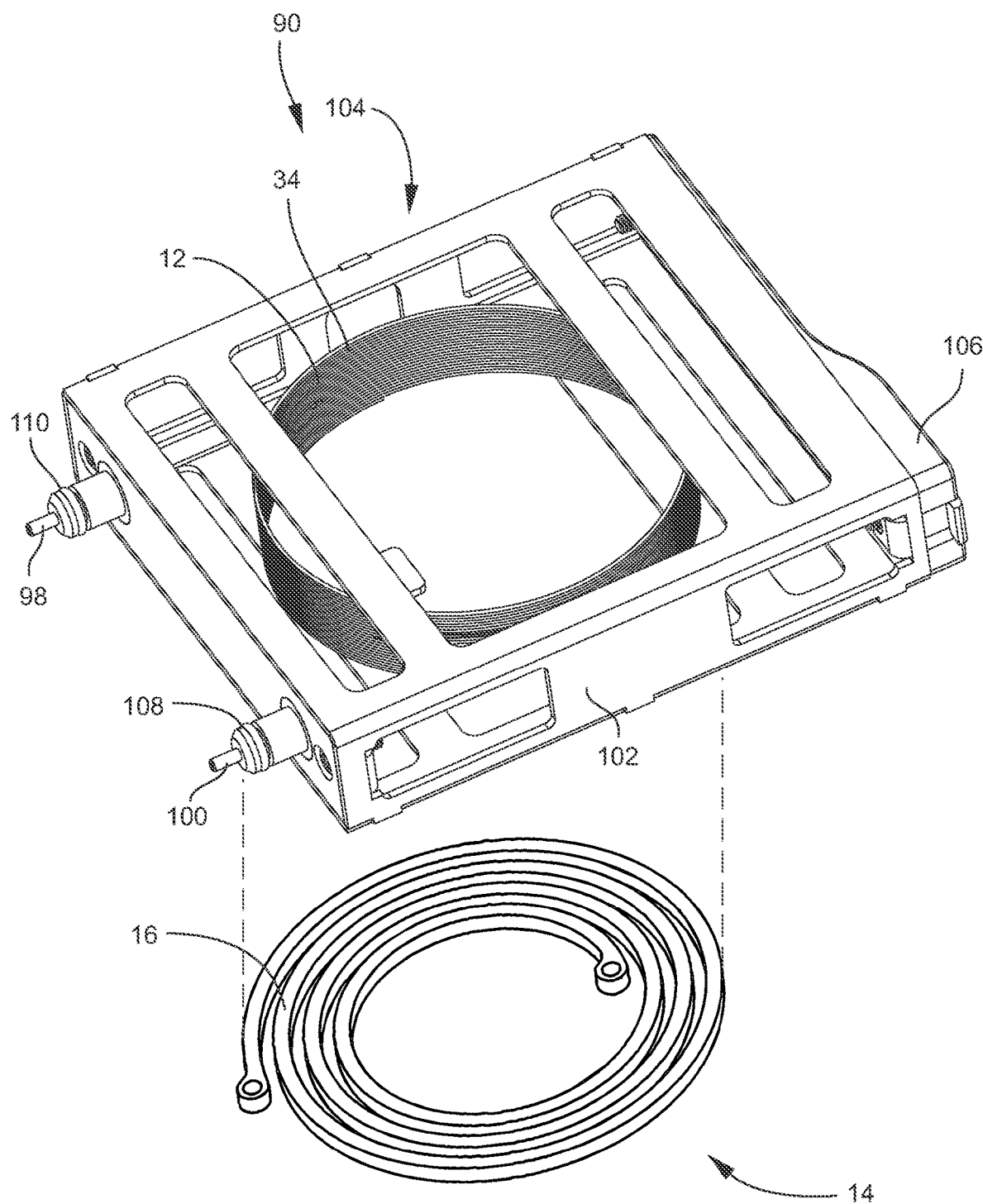
FIG. 17 is a perspective top view of select embodiments of the removable column according to select embodiments of the instant disclosure.
Figure 26:
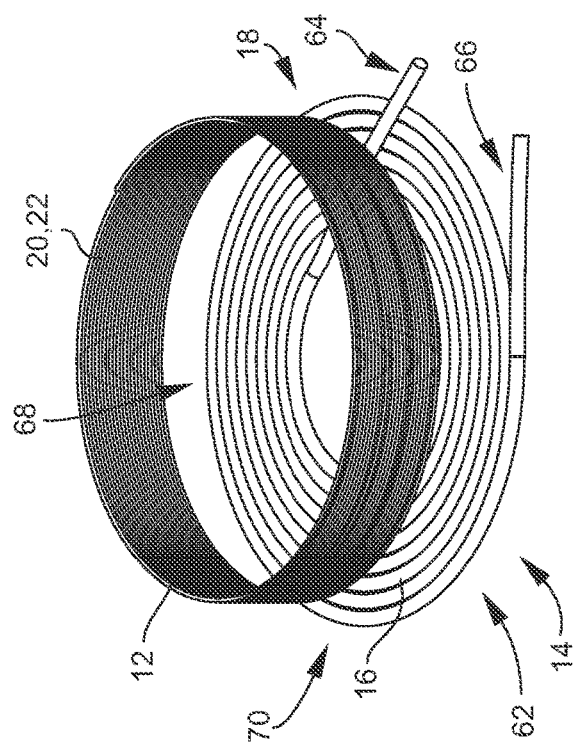
FIG. 26 is a top perspective view of select embodiments of a pancake coil for inductively heating the column of the miniature GC according to select embodiments of the instant disclosure.
Figure 29:
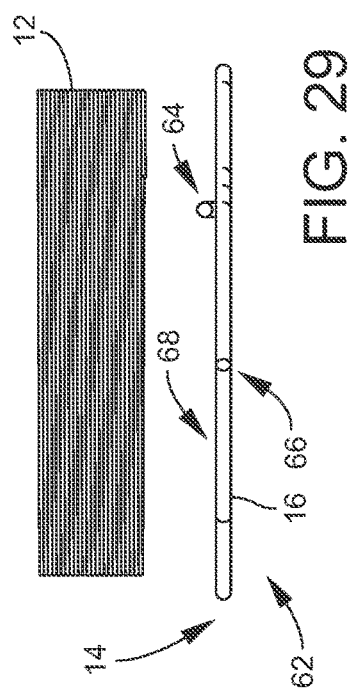
FIG. 29 is a front view of the pancake coil of FIG. 26 for inductively heating the column of the miniature GC according to the instant disclosure.
Figure 27:
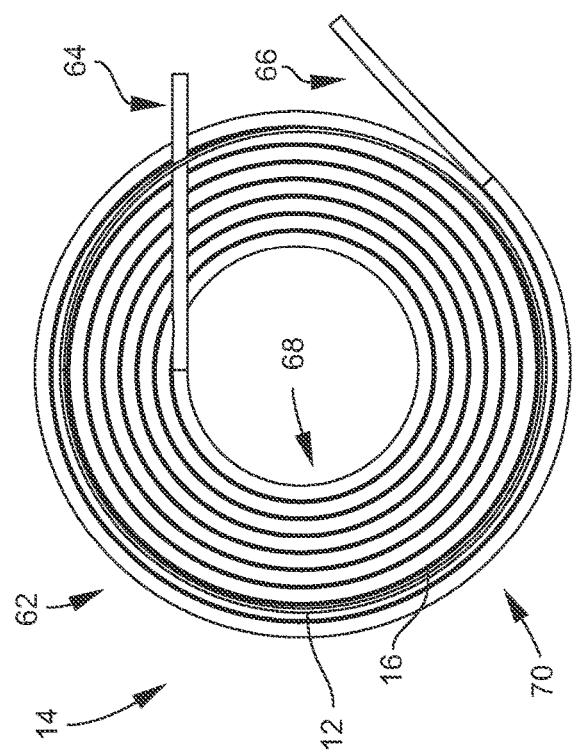
FIG. 27 is a top view of the pancake coil of FIG. 26 for inductively heating the column of the miniature GC according to the instant disclosure.
Figure 28:
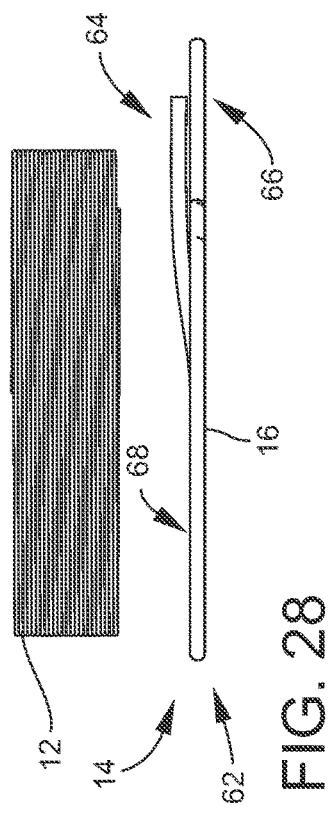
FIG. 28 is a side view of the pancake coil of FIG. 26 for inductively heating the column of the miniature GC according to the instant disclosure.

Referring to FIGS. 1-7, the overall size and shape of select embodiments of the instant gas chromatograph device 10 is shown with the cover on. Referring to FIGS. 8-16, the overall size and shape of select embodiments of the instant gas chromatograph device is shown with the cover removed. These Figures show different perspectives of the overall Mini GC 10. FIG. 1 shows the front of the unit where the removable column holder 90 may be inserted into the system. In FIGS. 1 and 2, the removable column holder 90 is in the system and locking mechanism 92 is shown in a locked position in the top diagram and in an unlocked position in the bottom diagram, where the locking mechanism is swung out for accessing the removable column holder 90 inside cartridge slot 88. However, the instant disclosure is not so limited to this embodiment of locking mechanism 92, and other designs for engaging and disengaging the locking mechanism 92 on the removable column holder 90 may be provided. The chimney looking thing shown sticking up from the top of the unit is the top of injection port 84. This may be where the user would inject a sample from a syringe. On the back of the system, which can be seen in FIG. 5, you can see four gas fittings 86. These are the fittings where the needed gases (Helium, Hydrogen, Purified Compressed Air, or other needed gases) are plumbed into the system. The other openings may be for fans 26 and air movement.

Gas chromatograph device 10 may have a length, a width, and a height. Any and/or all of these dimensions may be smaller than the known standard gas chromatographs for making the instant mini GC 10. In select embodiments, the total volume provided by the length, the width, and the height may be less than 20 cubic feet. In other select embodiments, the total volume provided by the length, the width and the height may be less than 10 cubic feet. In other select possibly preferred embodiment, as shown in the Figures, the total volume provided by the length, the width and the height may be approximately or equal to 1.08574 cubic feet. In select embodiments, the length may be less than 4 feet, the width may be less than 4 feet, and/or the height may be less than 4 feet. In other select embodiments, the length may be less than 3 feet, the width may be less than 2 feet, and/or the height may be less than 2 feet. In other select possibly preferred embodiments, as shown in the Figures, the length may be approximately or equal to 16.4 inches, the width may be approximately or equal to 10.4 inches, and the height may be approximately or equal to 11.0 inches. However, the disclosure is not so limited, and any desired shape and/or sizes of gas chromatograph 10 may be provided.

As a result of these smaller or miniaturized dimensions, the instant gas chromatograph 10 may be designed to provide a smaller more portable gas chromatograph that will allow for the unit to take up minimum space and thus be more readily available to multiple users inside and outside of academia and/or industrial labs.

Referring now to FIGS. 8, 9, 11-16 and 18-33, inductive heating source 14 with inductive heating element or coil 16 may be included for inductively heating column 12. In select embodiments, as shown in the Figures, inductive heating element or coil 16 may be configured to induce a current directly into skin 20 of outer layer 22 of column 12. Skin 20 of outer layer 22 of column 12 may be any material configured for inductive heating. In select embodiments, skin 20 of outer layer 22 of column 12 may be metal or silica. In select possibly preferred embodiments, skin 20 of outer layer 22 of column 12 may be metal. Column 12 may be any known or later discovered column configured for gas chromatography. In select embodiments, column 12 may be a metal or silica column configured for gas chromatography. Column 12 may be provided in any desires shape or form configured for gas chromatography. In select embodiments, as shown in the Figures, column 12 may be provided in a coiled form. In select embodiments, the inductive heating element or coil 16 may be configured to directly heat column 12 controllably up to needed temperature 24. Needed temperature 24 may be any needed or required temperature for gas chromatography in column 12. In select embodiments, the inductive heating element or coil 16 may be configured to directly heat column 12 controllably up to needed temperature 24 and hold column 12 at needed temperature 24, like for specific durations for gas chromatograph within column 12. This may be controlled by various sensors and processors, as shown in the Figures.

Referring now to FIGS. 5 and 8-16, at least one fan 25 may be included in gas chromatograph device 10 Wherein, the inductive heating element or coil 16 may be configured to allow gas chromatograph device 10 to cool column 12 by turning off inductive heating element or coil 16 and blowing or fanning cool air 28 over the column via the fans 26. This may be controlled by various sensors and processors, as shown in the Figures. In select embodiments, as shown in the Figures, two fans 26 may be included in gas chromatograph device 10. In select embodiments, as shown in the Figures, one fan 26 may be included at the rear of the unit and positioned behind a grate or screen for forcing cool air 28 into or out of cover 82 from the rear. Another fan 26 may be included above cartridge slot 88 for forcing air over column 12 when removable column holder 90 is positioned inside cartridge slot 88. Frame 80 of gas chromatograph device 10 may be included, as shown in the Figures, with minimal design and various slots, holes, notches, etc. for allowing air flow through gas chromatograph device 10.

Temperature sensor 30 may be included in select embodiments of gas chromatograph device 10. See FIGS. 8-16. Temperature sensor 30 may be for measuring the temperature of column 12, including, but not limited to, measuring temperature 32 of surface 34 of inductively heated column 12. Temperature sensor 30 may be configured for noncontact, direct temperature measurement of column 12. As such, temperature sensor 30 may be positioned inside gas chromatograph device 10 in any position with a line of sight of column 12 when removable column holder 90 is positioned in cartridge slot 88. As shown in FIGS. 8, 10, 11, 13, 15 and 16, temperature sensor 30 may be mounted in temperature sensor mount 37 on the side of cartridge slot 88. Temperature sensor mount 37 may include a hole configured for receiving temperature sensor 30. This position of temperature sensor mount 37 may provide a clear line of sight of column 12 when positioned in removable column holder 90 in cartridge slot 88 via holes, vents, slots 104 of housing 102 of removable column holder 90. Wherein, temperature sensor 30 may be configured to read surface temperature 32 of surface 34 of column 12 without touching column 12. In select embodiments, inductive heating source 14 may be configured to be controlled by temperature sensor 30. In these embodiments, inductive heating of column 12 may be controlled by the noncontact, direct temperature measurement of column 12. Temperature sensor 30 may be any temperature sensor configured for reading the temperature of column 12. In select embodiments, temperature sensor 30 may be infrared temperature sensor 36, as shown in FIGS. 8, 10, 11, 13, 15 and 16. Infrared temperature sensor 36 may be any infrared sensor or like sensor, configured for noncontact, direct temperature measurement of column 12

Referring now specifically to FIGS. 18-21, in select embodiments of the instant gas chromatograph device 10, inductive heating element or coil 16 may be flat square coil 38. Flat square coil 38 may include square inlet portion 40, square outlet portion 42, and a plurality of linear coil rows 44. As shown in these Figures, the linear coil rows 44 may form square or rectangular shape 46 between square inlet portion 40 and square outlet portion 42. Wherein, the plurality of linear coil rows 44 may be positioned above, below or to the side of column 12 for inductively heating column 12 with the flat square coil 38. In select possibly preferred embodiments, as shown in FIGS. 8-17, the plurality of linear coil rows 44 of flat square coil 38 may be positioned below column 12.

Referring now specifically to FIGS. 22-25. in select embodiments of the instant gas chromatograph device 10, the inductive heating element or coil 16 may be knuckle coil 48. Knuckle coil 48 may include knuckle inlet portion 50, knuckle outlet portion 52, first curled knuckle portion 54, second curled knuckle portion 56, and curved portion 58. First curled knuckle portion 54 may be connected to knuckle inlet portion 50 and may be configured to extend from above column 12 to below column 12 on a first side. Second curled knuckle portion 56 may be connected to knuckle outlet portion 52 and may be configured to extend from above column 12 to below column 12 on a second side. Curved portion 58 may be configured to connect first curled knuckle portion 54 to second curled knuckle portion 56. Wherein, curved portion 58 may have radius 60 configured to go around column 12 in removable column holder 90. Wherein, column 12 may be configured to fit between knuckle inlet and outlet portions 50 and 52, and curved portion 58 for inductively heating column 12 with knuckle coil 48. As such, knuckle coil 48 may be positioned around cartridge slot 88 for allowing removable column holder 90 with column 12 to be inserted and removed from cartridge slot 88.

Referring now to FIGS. 26-29, in select embodiments of the instant gas chromatograph device 10, the inductive heating element or coil 16 may be pancake coil 62. Pancake coil 62 may include pancake inlet portion 64, pancake outlet portion 66, and plurality of enlarging circular coils 68 inside one another forming pancake shape 70 between pancake inlet portion 64 and pancake outlet portion 66. Wherein, the plurality of enlarging circular coils 68 may be positioned above, below or to the side of column 12 for inductively heating column 12 with pancake coil 62. In select possibly preferred embodiments, the plurality of enlarging circular coils 68 of pancake coil 62 may be positioned below column 12, as shown in FIGS. 8-17.

Referring now to FIGS. 30-33, in select embodiments of the instant gas chromatograph device 10, the inductive heating element or coil 16 may be round coil 72. Round coil 72 may include round inlet portion 74, round outlet portion 76, and a plurality of tubular coils 78 forming tube shape 79 between round inlet portion 74 and round outlet portion 76. Wherein, the plurality of tubular coils 78 may be configured to be placed around or inside column 12 for inductively heating column 12 with round coil 72. In select possibly preferred embodiments, the plurality of tubular coils 78 of round coil 72 may be positioned around column 12, as shown in FIG. 30.

Referring to FIGS. 8-16, frame 80 may be included in gas chromatograph device 10. Frame 80 may be for supporting the components and structures of gas chromatograph device 10. As shown in the Figures, frame 80 may be configured for minimum size and structure of gas chromatograph device 10. Frame 80 may include various passageways and air ways for circulating cool air 28 via fans 26 and in and out of vent holes 96 in cover 82. In select embodiments, frame 80 may include two layers, where the top layer may be configured for gas chromatography, and the bottom layer may be configured for the processors for controlling gas chromatography of mini GC 10.

Referring now to FIGS. 1-7, cover 82 may be included with the instant gas chromatograph device 10. Cover 82 may be for protecting the inside components and parts from the outside environment. Cover 82 may include side components as well as a top component. Cover 82 may include vent holes 96 in various positions around cover 82 configured for allowing cool air 28 to flow in and out of gas chromatograph device 10.

Referring now to FIGS. 1-16, injection port 84 may be included with the instant gas chromatograph device 10. Injection port 84 may be for inserting or injecting the fluid to be analyzed, or conducted gas chromatography on, inside gas chromatograph device 10. As shown in the Figures, injection pot 84 may be positioned through the top of cover 82 for inserting or injecting the gas inside gas chromatograph device 10. Injection port 84 may be any known or standard injection port for GCs. In select embodiments, injection port 84 may include injection manifold 85. See FIGS. 11-14 and 16. Injection manifold 85 may be for controlling the fluid injected through injection port 84 with fluid introduced into column 12. As such, injection manifold 85 may be in fluid communication with column 12 via injector port pin 98. See FIGS. 13, 14 and 17.

Referring to FIGS. 3-5, 10, and 12-16, gas fittings 86 may be included with the instant gas chromatograph device 10. Gas fittings 86 may be for introducing additional fluids or carrier gases into the gas chromatography process inside mini GC 10. Gas fittings 86, may be positioned on the back of gas chromatograph device 10, as shown in the Figures. In gas chromatography inside mini GC 10, the mobile phase (or "moving phase") may be a carrier gas, usually an inert gas such as helium or an unreactive gas such as nitrogen. Helium remains the most commonly used carrier gas in most common instruments, however hydrogen may be preferred for improved separations. Gas fittings 86 may be the fittings where the needed gases (Helium, Hydrogen, Purified Compressed Air, or other needed gases) are plumbed into the system of gas chromatograph device 10.

Referring now to FIGS. 1-2, 6-9, and 11-17, removable column holder 90 may be included with the instant gas chromatograph device 10. Removable column holder 90 may be for holding column 12. Removable column holder 90 may allow for easy and quick removal and insertion of column 12 to and from cartridge slot 88 of gas chromatograph device 10. Removable column holder 90 may include housing 102 configured to secure column 12 inside removable column holder 90. Housing 102 may include plurality of holes, vents, slots 104, etc. for providing air flow through column 12. Housing 102 may include tab 106 on the outer side of removable column holder 90. Tab 106 may be for manipulating or gripping removable column holder 90, like for inserting and removing removable column holder 90 to and from cartridge slot 88 of gas chromatograph device 10. Removable column holder 90 may include detector o-ring 108 for sealing detector pin 100 to detector 94 (or lines thereto) when removable column holder 90 is inserted into cartridge slot 88 of gas chromatograph device 10. Likewise, removable column holder 90 may include injector o-ring 110 for sealing injector port pin 98 with injector port 84 (or lines thereto) when removable column holder 90 is inserted into cartridge slot 88 of gas chromatograph device 10. Locking mechanism 92 may be included with gas chromatograph device 10. Locking mechanism 92 may be for securing removable column holder 90 inside cartridge slot 88 of gas chromatograph device 10. Locking mechanism 92 may be any device or mechanisms configured for securing removable column holder 90 inside cartridge slot 88 of gas chromatograph device 10. As shown in the Figures, locking mechanism 92 may be a latch system configured to hinge from one side of cartridge slot 88 to the other side for securing removable column holder 90 inside cartridge slot 88. The instant disclosure is designed to provide a system that is a GC that utilizes removable GC column holder 90 that is small, lightweight, low cost, with an easily removable column, and able to handle a wide variety of GC columns 12. This removable column holder 90 may be unique in that the column holder only holds the column, making it the smallest, lightest, and lowest cost possible. Also, the removable column holder 90 may be very easy to interchange columns 12 into the cartridge and may allow the user to affordably interchange many columns 12. The removable column holder 90 may also protect the fragile column 12 from mechanical damage and contamination due to handling that is common for columns not in holders.

Referring to FIGS. 1-2, 6-9, 11-16, cartridge slot 88 may be included with the instant gas chromatograph device 10. Cartridge slot 88 may be for receiving and removing removable column holder 90 in and out of gas chromatograph device 10. As such, cartridge slot 88 may be configured to receive removable column holder 90 with column 12. Cartridge slot 88 may be designed and sized to receive removable column holder 90. Wherein, the inductive heating source 14 may be positioned above, below, or around cartridge slot 88. In select possibly preferred embodiments, the inductive heating source 14 may be positioned below cartridge slot 88, as shown in the Figures.

Detector 94 may be included in gas chromatograph device 10. See FIGS. 8, 9, and 12-16. Detector 94 may be used for detection during or after the gas chromatography process. As the compounds separate based on their rate of progress through column 12 they will exit column 12 through detector pin 100 and go into detector 94 where detector 94 may report the intensity of each compound which correlates to the amount of that compound. Detector 94 may include detector board 95.

Figure 34:
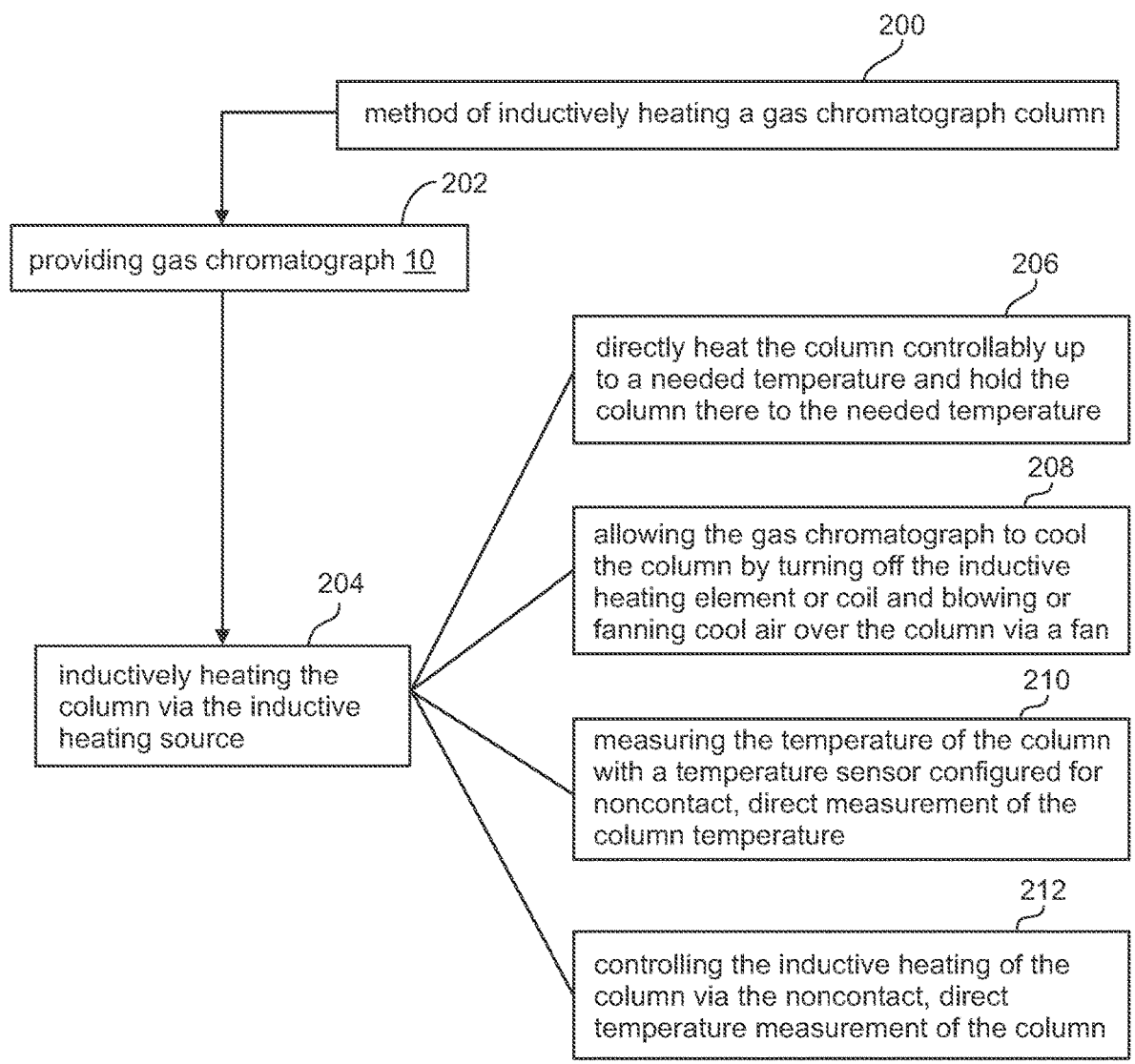
FIG. 34 is a flow diagram of select embodiments of the method of inductively heating a gas chromatograph column according to select embodiments of the instant disclosure.

Referring now to FIG. 34, in another aspect, the instant disclosure embraces method 200 of inductively heating gas chromatograph column 12 in gas chromatograph device 10. Method 200 may generally include step 202 of providing gas chromatograph device 10 of the instant disclosure in any of the various embodiments shown and/or described herein. As such, gas chromatograph device 10 may be provided with at least column 12 configured for gas chromatography, and inductive heating source 14 configured to directly or indirectly heat column 12, where inductive heating source 14 includes inductive heating element or coil 16, and inductive heating element or coil 16 is configured to induce a current directly or indirectly in column 12. Accordingly, method 200 of inductively heating gas chromatograph column 12 in gas chromatograph device 10 may further include step 204 of heating column 12 via inductive heating source 14. One feature of method 200 of inductively heating gas chromatograph column 12 in gas chromatograph device 10, is that step 204 of heating column 12 may not require an oven in or around gas chromatograph device 10.

In select embodiments of method 200 of inductively heating gas chromatograph column 12 in gas chromatograph device 10, method 200 may further include the steps of: step 206 of directly heating column 12 controllably up to needed temperature 24 and holding column 12 at needed temperature 24; step 208 of allowing gas chromatograph device 10 to cool column 12 by turning off the inductive heating element or coil 16 and blowing or fanning cool air 28 over column 12 via at least one fan 26; step 210 of measuring temperature 32 of column 12 with temperature sensor 30 configured for noncontact, direct measurement of temperature 32 of column 12; and/or step 212 of controlling the inductive heating of column 12 via the noncontact, direct temperature measurement of column 12.

Accordingly, the instant disclosure may be directed toward gas chromatograph device 10 with inductive heating of column 12. As such, the instant disclosure provides a gas chromatograph system that may provide an inductively heated column 12. Prior to the instant disclosure, inductive heating may have been unimaginable since for many years metal and silica columns were not used or common, meaning that inductive heating would not have worked on these columns. Convection heating via air ovens and resistive elements have been the norm. With inductive heating, column 12 can be hang in free space with no need for an oven around it. This may allow for rapid cooling and for a much smaller and lower cost overall system design of gas chromatograph device 10. Together with the disclosure herein of the non-contact direct temperature measurement of the column with temperature sensor 30, the instant disclosure may provide faster heating and more accurate temperature measurement which may result in faster and more reproducible chromatography.

Traditionally, prior to the instant disclosure, GC columns were hung in a convection oven that resides within the GC. The air in the oven is heated up by resistance elements and then the air heats up the column that is suspended in the air oven. During the course of the GC run, the oven heats up in controlled temperature ramps to help different compounds progress through the column at different rates for separation before detection in the detector. At the end of the run, the oven remains at an elevated temperature for a brief period of time to ensure that all the compounds in the injection mixture have exited the column, then the oven cools down via a cooling fan to the lower temperature that is needed for the beginning of the GC run. The cooling fan moves hot air out of the oven and moves cooler air into the oven in order to cool the column down.

The instant disclosure of inductive heating for column 12 of gas chromatograph device 10 may provide inductive heating element or coil 16 that induces a current directly in skin 20 of outer layer 22 of the GC column 12. This may allow gas chromatograph device 10 of the instant disclosure to rapidly and directly heat column 12 up very controllably to needed temperatures 24 and hold column 12 at needed temperature 24. This may also allow gas chromatograph device 10 disclosed herein to cool the column extremely rapidly since it will only have to turn off inductive heating element or coil 16 and blow cool air 28 across the column. The gas chromatograph device 10 does not have to cool down an entire oven, just column 12. Also, gas chromatograph device 10 is not heating up an entire oven, just column 12.

The basis of this inductive heating element for gas chromatograph device 10 disclosed herein, is using inductive heating to directly or indirectly heat GC column 12. This provides major advantages in that it allows GC column 12 to be rapidly heated very efficiently without creating a lot of extra heat in the system that has to be managed and without the need for an oven to contain and thermally isolate column 12 so that it can be heated. Because the inductive heating allows GC device 10 to be designed without the need for an oven, column 12 can also be cooled much more quickly than conventional GC systems. Quicker heating and cooling also allows for better GC results and faster GC results. The ability to design miniature gas chromatograph device 10 without an oven may allow for much smaller, lighter, and a less expensive GC.

Referring now to FIGS. 18-33, several drawings are included that show different configurations of the inductive heating source 14 (seen as the larger diameter wire) in relation to the GC column 12 (the smaller diameter wire). The inductive heating source 14 may be a wire through which electricity flows. By creating electrical current 18 in this wire, you create a magnetic field around the wire, based on a basic electromagnetic principal by which any electrical current (a flow of electrons) creates a magnetic field around that current 18. This magnetic field will then induce current 18 in other materials (primarily metals) that are in the right proximity. In the different embodiments shown in these Figures, the inductive heating sources 14 shown will induce a current in GC column 12. Inducing current 18 in skin 20 of the column 12 (like metal or silica) may create heat in column 12 due to resistance. In some of the embodiments shown, metal or silica GC columns 12 may be heated via the inductive heating source 14, i.e. direct inductive heating. In other embodiments, nonmetal columns 12 are heated via inductive heating by wrapping the nonmetal columns in a metal coil, metal mesh, or via contact with a metal surface. In these cases, something in contact with the nonmetal GC column 12 is being heated inductively then passing that heat into column 12. This is considered indirect inductive heating of column 12.

The instant disclosure also provides for noncontact, direct temperature measurement of GC column 12. In combination with the direct and indirect heating of column 12 via inductive heating, the instant gas chromatograph device 10 may be able to measure temperature of the column itself by temperature sensor 30 (like infrared temperature sensor 36) that may be able to read the temperature 32 of surface 34 of column 12 without touching it. Traditionally, in GCs, the column is hung in an air oven and the air is heated which then heats the column, where only the temperature of the air is measured, not the temperature of the column. The instant direct measurement of temperature 32 of column 12 may result in better control which results in better and more repeatable results. The instant noncontact, direct temperature measurement technique in combination with inductive heating, may provide unique advantages to the GC device 10.

In sum, the instant inductive heating of column 12 of the gas chromatograph device 10 may heat and cool column 12 much more rapidly and in a much smaller space. This feature may allow the gas chromatograph to be smaller and lowers cost in the unit because gas chromatograph device 10 is not having to utilize a large oven that can handle high temperatures. The only part of the system (other than injection port 84 and detector 94) that are experiencing elevated temperatures is column 12 and the metal supports from which column 12 is hung. Everything else around column 12 can be made much lighter and much more affordably because of the lower temperature requirements. It also allows the unit to be much smaller. An additional effect the inductive heating has is that it heats column 12 more uniformly which results in more repeatable results and better separating capability.

In the specification and/or figures, typical embodiments of the disclosure have been disclosed. The present disclosure is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The foregoing description and drawings comprise illustrative embodiments. Having thus described exemplary embodiments, it should be noted by those skilled in the art that the within disclosures are exemplary only, and that various other alternatives, adaptations, and modifications may be made within the scope of the present disclosure. Merely listing or numbering the steps of a method in a certain order does not constitute any limitation on the order of the steps of that method. Many modifications and other embodiments will come to mind to one skilled in the art to which this disclosure pertains having the benefit of the teachings presented in the foregoing descriptions and the associated drawings. Although specific terms may be employed herein, they are used in a generic and descriptive sense only and not for purposes of limitation. Accordingly, the present disclosure is not limited to the specific embodiments illustrated herein but is limited only by the following claims.

The invention claimed is:
1. A gas chromatograph device comprising:
 a column configured for gas chromatography; and
 an inductive heating source configured to directly or indirectly heat the column, said inductive heating source includes an inductive heating element or coil, said inductive heating element or coil is configured to induce a current directly or indirectly in the column;
 wherein, the column in the gas chromatograph is inductively heated via the inductive heating source;
 where the inductive heating element or coil is a flat square coil, a knuckle coil, or a pancake coil, wherein:
  the flat square coil includes:
   a square inlet portion;
   a square outlet portion; and
   a plurality of linear coil rows forming a square or rectangular shape between the square inlet portion and the square outlet portion;
   wherein, the plurality of linear coil rows is positioned above or below the column, where the flat square coil is configured for inductively heating the column;
  the knuckle coil includes:
   a knuckle inlet portion;
   a knuckle outlet portion;
   a first curled knuckle portion connected to the knuckle inlet portion configured to extend from above the column to below the column;
   a second curled knuckle portion connected to the knuckle outlet portion configured to extend from above the column to below the column; and
   a curved portion configured to connect the first curled knuckle portion to the second curled knuckle portion, wherein the curved portion has a radius configured to go around the column in a removable column holder;
   wherein, the column is configured to fit between the knuckle inlet and outlet portions, and the curved portion, where the knuckle coil is configured for inductively heating the column:
  or
  the pancake coil includes:
   a pancake inlet portion;
   a pancake outlet portion; and
   a plurality of enlarging circular coils inside one another forming a pancake shape between the pancake inlet portion and the pancake outlet portion;
   wherein, the plurality of enlarging circular coils are positioned above or below the column, where the pancake coil is configured for inductively heating the column.

2. The gas chromatograph device according to claim 1, wherein the gas chromatograph does not require an oven.

3. The gas chromatograph device according to claim 1, wherein the inductive heating element or coil is configured to induce a current directly into a skin of an outer layer of the column, wherein the column is a metal or silica column configured for gas chromatography.

4. The gas chromatograph device according to claim 3, wherein the inductive heating element or coil is configured to directly heat the column controllably up to a needed temperature and hold the column there to the needed temperature.

5. The gas chromatograph device according to claim 4 further comprising at least one fan, wherein the inductive heating element or coil is configured to allow the gas chromatograph to cool the column by turning off the inductive heating element or coil and blowing or fanning cool air over the column via the at least one fan.

6. The gas chromatograph device according to claim 1 further including a temperature sensor configured for noncontact, direct temperature measurement of the column, wherein the temperature sensor is configured to read a surface temperature of a surface of the column without touching the column, wherein the inductive heating source is configured to be controlled by the temperature sensor, wherein the inductive heating of the column is controlled by the noncontact, direct temperature measurement of the column.

7. The gas chromatograph device according to claim 6, wherein the temperature sensor is an infrared temperature sensor.

8. The gas chromatograph device according to claim 1, wherein the inductive heating element or coil is the flat square coil.

9. The gas chromatograph device according to claim 1, wherein the inductive heating element or coil is the knuckle coil.

10. The gas chromatograph device according to claim 1, wherein the inductive heating element or coil is the pancake coil.

11. The gas chromatograph device according to claim 1 further comprising:
a frame;
a cover;
an injection port;
gas fittings in fluid communication with the injection port;
a cartridge slot configured to receive a removable column holder with the column, wherein the inductive heating source is positioned above, below, or around the cartridge slot;
a locking mechanism configured for securing the removable column holder inside the cartridge slot;
a detector;
at least one vent hole in the cover configured for providing air flow through the column via at least one fan;
said column in the removable column holder including:
an injector port pin in fluid communication with the injection port; and
a detector pin in fluid communication with the detector; and
said removable column holder including:
a housing;
a plurality of holes, vents, slots, or combinations thereof configured for air flow through the column;
a tab configured for gripping the removable column holder to insert or remove the removable column holder from the cartridge slot;
a detector o-ring configured for sealing the detector pin of the column to the detector when the removable column holder is inserted and locked in the cartridge slot; and
an injector o-ring configured for sealing the injector port pin of the column to the injection port when the removable column holder is inserted and locked in the cartridge slot.

12. A gas chromatograph device comprising:
a column with an outer layer including a skin; and
an inductive heating source configured to directly heat the skin of the outer layer of the column, said inductive heating source includes an inductive heating element or coil configured to heat the column controllably up to a needed temperature and hold the column there to the needed temperature;
the inductive heating element or coil is configured to allow the gas chromatograph to cool the column by turning off the inductive heating element or coil and blowing or fanning cool air over the column via at least one fan;
the inductive heating element or coil is a flat square coil, a knuckle coil, a pancake coil, or a round coil
wherein, the column is inductively heated;
wherein the gas chromatograph does not require an oven;
an infrared temperature sensor configured for noncontact, direct temperature measurement of the column, wherein the temperature sensor is configured to read a surface temperature of a surface of the column without touching the column, wherein the inductive heating source is configured to be controlled by the temperature sensor, wherein the inductive heating of the column is controlled by the noncontact, direct temperature measurement of the column;
a frame;
a cover;
an injection port;
gas fittings in fluid communication with the injection port;
a cartridge slot configured to receive a removable column holder with the column, wherein the inductive heating source is positioned above, below, or around the cartridge slot;
a locking mechanism configured for securing the removable column holder inside the cartridge slot;
a detector;
at least one vent hole in the cover configured for providing air flow through the column via the at least one fan;
said column in the removable column holder including:
an injector port pin in fluid communication with the injection port; and
a detector pin in fluid communication with the detector; and
said removable column holder including:
a housing;
a plurality of holes, vents, slots, or combinations thereof configured for air flow through the column;
a tab configured for gripping the removable column holder to insert or remove the removable column holder from the cartridge slot;
a detector o-ring configured for sealing the detector pin of the column to the detector when the removable column holder is inserted and locked in the cartridge slot; and
an injector o-ring configured for sealing the injector port pin of the column to the injection port when the removable column holder is inserted and locked in the cartridge slot.

13. A method of inductively heating a gas chromatograph column configured for gas chromatography comprising:
providing a gas chromatograph device with the gas chromatograph column configured for gas chromatography, and an inductive heating source configured to directly or indirectly heat the column, said inductive heating source includes an inductive heating element or coil, said inductive heating element or coil is configured to induce a current directly or indirectly in the column;
where the inductive heating element or coil is a flat square coil, a knuckle coil, or a pancake coil, wherein:
the flat square coil includes:
a square inlet portion;
a square outlet portion; and
a plurality of linear coil rows forming a square or rectangular shape between the square inlet portion and the square outlet portion;

wherein, the plurality of linear coil rows is positioned above or below the column, where the flat square coil is configured for inductively heating the column;

the knuckle coil includes:
- a knuckle inlet portion;
- a knuckle outlet portion;
- a first curled knuckle portion connected to the knuckle inlet portion configured to extend from above the column to below the column;
- a second curled knuckle portion connected to the knuckle outlet portion configured to extend from above the column to below the column; and
- a curved portion configured to connect the first curled knuckle portion to the second curled knuckle portion, wherein the curved portion has a radius configured to go around the column in a removable column holder;
- wherein, the column is configured to fit between the knuckle inlet and outlet portions, and the curved portion, where the knuckle coil is configured for inductively heating the column;

or the pancake coil includes:
- a pancake inlet portion;
- a pancake outlet portion; and
- a plurality of enlarging circular coils inside one another forming a pancake shape between the pancake inlet portion and the pancake outlet portion;
- wherein, the plurality of enlarging circular coils are positioned above or below the column, where the pancake coil is configured for inductively heating the column; and heating the column via the flat square coil, the knuckle coil, or the pancake coil.

14. The method according to claim 13, wherein the step of heating the gas chromatograph column does not require an oven.

15. The method according to claim 13 further comprising:
- directly heating the gas chromatograph column controllably up to a needed temperature and holding the gas chromatograph column at the needed temperature;
- allowing the gas chromatograph device to cool the gas chromatograph column by turning off the inductive heating element or coil and blowing or fanning cool air over the gas chromatograph column via at least one fan;
- measuring a temperature of the gas chromatograph column with a temperature sensor configured for noncontact, direct measurement of the temperature of the gas chromatograph column; and
- controlling the inductive heating of the gas chromatograph column via the noncontact, direct temperature measurement of the column.

* * * * *